United States Patent
Sakhnini et al.

(10) Patent No.: US 12,363,660 B2
(45) Date of Patent: Jul. 15, 2025

(54) BEAM SELECTION DISCOVERY WINDOW MONITORING

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/675,247

(22) Filed: Feb. 18, 2022

(65) Prior Publication Data

US 2022/0272647 A1    Aug. 25, 2022

Related U.S. Application Data

(60) Provisional application No. 63/152,150, filed on Feb. 22, 2021.

(51) Int. Cl.
*H04W 56/00* (2009.01)
*H04W 16/28* (2009.01)

(52) U.S. Cl.
CPC ....... *H04W 56/0015* (2013.01); *H04W 16/28* (2013.01)

(58) Field of Classification Search
CPC .......................... H04W 56/0015; H04W 16/28
USPC ........................................................ 370/350
See application file for complete search history.

(56) References Cited

U.S. PATENT DOCUMENTS

| | | | |
|---|---|---|---|
| 2019/0182817 A1* | 6/2019 | Agiwal | H04B 7/0617 |
| 2020/0314673 A1 | 10/2020 | Deogun et al. | |
| 2020/0396744 A1 | 12/2020 | Xiong et al. | |
| 2021/0022096 A1 | 1/2021 | Rane et al. | |
| 2021/0051485 A1* | 2/2021 | Lin | H04W 72/0446 |
| 2021/0314785 A1* | 10/2021 | Raghavan | H04W 76/11 |
| 2021/0376894 A1* | 12/2021 | Cha | H04B 7/0695 |
| 2022/0240160 A1* | 7/2022 | Jang | H04W 48/12 |
| 2023/0328793 A1* | 10/2023 | Christoffersson | H04W 74/004 370/329 |

OTHER PUBLICATIONS

International Search Report and Written Opinion—PCT/US2022/017161—ISA/EPO—Jun. 2, 2022 (2103074WO).

* cited by examiner

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may perform cell discovery in a window by monitoring for and receiving synchronization signal blocks (SSBs) from a network entity. The UE may receive an indication of a numerical quantity of beams in a set of beams associated with SSB transmission during a discovery window. The UE may map a set of SSB transmissions within the discovery window to a set of SSB candidates within the discovery window using the receive indication of the numerical quantity of beams. The UE may select, for each SSB candidate of the set of SSB candidates, a beam from the set of beams for monitoring each SSB candidate. The UE may monitor the SSB candidates in accordance with the beam selected for each SSB candidate. The UE may then receive one or more SSBs in accordance with the monitoring.

30 Claims, 17 Drawing Sheets

BEAM SELECTION DISCOVERY WINDOW MONITORING

CROSS REFERENCE

The present application for patent claims the benefit of U.S. Provisional Patent Application No. 63/152,150 by SAKHNINI et al., entitled "BEAM SELECTION DISCOVERY WINDOW MONITORING," filed Feb. 22, 2021, assigned to the assignee hereof, and expressly incorporated by reference herein.

FIELD OF TECHNOLOGY

The following relates to wireless communications, including beam selection discovery window monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Synchronization signal blocks (SSBs) or physical broadcast channel (PBCH) may be used for cell searches. A beam may correspond to multiple SSBs and SSB transmission occasions. A UE may receive SSBs or PBCHs from a base station. A UE may identify a beam based on a received SSB.

SUMMARY

The described techniques relate to improved methods, systems, devices, and apparatuses that support beam selection discovery window monitoring. Generally, the described techniques provide for a user equipment (UE) to perform cell discovery in a window by monitoring for and receiving synchronization signal blocks (SSBs) from a network entity. The UE may receive an indication of a numerical quantity of beams in a set of beams associated with SSB transmission during a discovery window (e.g., in a licensed radio frequency spectrum band or in an unlicensed radio frequency spectrum band). The UE may map a set of SSB transmissions within the discovery window to a set of SSB candidates within the discovery window using the receive indication of the numerical quantity of beams, where the set of SSB candidates is a subset of a total number of SSB candidates within the discovery window. The UE may select, for each SSB candidate of the set of SSB candidates associated with the discovery window, a beam from the set of beams for monitoring each of the SSB candidates, where the beam is selected as a function of an index of the SSB candidate and the numerical quantity of beams. The UE may monitor the SSB candidates in accordance with the beam selected for each SSB candidate. The UE may then receive one or more SSBs in accordance with the monitoring.

A method for wireless communication at a UE is described. The method may include receiving an indication of a numerical quantity of beams in a set of beams associated with SSB transmissions during a discovery window, mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window, selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams, monitoring the plurality of SSB candidates in accordance with the beam selected for each SSB candidate, and receiving one or more SSBs in accordance with the monitoring.

An apparatus for wireless communication at a UE is described. The apparatus may include a processor, memory coupled with the processor, wherein the memory stores instructions. The instructions may be executable by the processor to cause the apparatus to receive an indication of a numerical quantity of beams in a set of beams associated with SSB transmissions during a discovery window, map a plurality of SSB transmissions within the discovery window to a plurality of SSB candidates within the discovery window using the received indication of the numerical quantity of beams, wherein the plurality of SSB candidates is a subset of a total number of SSB candidates within the discovery window, select, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams, monitor the plurality of SSB candidates in accordance with the beam selected for each SSB candidate, and receive one or more SSBs in accordance with a monitoring of the plurality of SSB candidates.

Another apparatus for wireless communication at a UE is described. The apparatus may include means for receiving an indication of a numerical quantity of beams in a set of beams associated with SSB transmissions during a discovery window, means for mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window, means for selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams, means for monitoring the plurality of SSB candidates in accordance with the beam selected for each SSB candidate, and means for receiving one or more SSBs in accordance with the monitoring.

A non-transitory computer-readable medium storing code for wireless communication at a UE is described. The code may include instructions executable by a processor to receive an indication of a numerical quantity of beams in a set of beams associated with SSB transmissions during a discovery window, map a plurality of SSB transmissions within the discovery window to a plurality of SSB candidates within the discovery window using the received indication of the numerical quantity of beams, wherein the plurality of SSB candidates is a subset of a total number of SSB candidates within the discovery window, select, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams, monitor the plurality of SSB candidates in accordance with the beam selected for each SSB candidate, and receive one or more SSBs in accordance with a monitoring of the plurality of SSB candidates.

In some examples of the method, apparatuses, and non-transitory computer-readable medium described herein, receiving the indication of the numerical quantity of beams may include operations, features, means, or instructions for receiving an express value of the numerical quantity of beams.

In some examples of the method, apparatuses, and non-transitory computer-readable medium described herein, receiving the indication of the numerical quantity of beams may include operations, features, means, or instructions for receiving a numerical value of sub-windows of the discovery window, each sub-window being associated with at least one SSB transmission over each beam of the set of beams, wherein the numerical quantity of beams may be implicit in the numerical value of sub-windows.

Some examples of the method, apparatuses, and non-transitory computer-readable medium described herein may further include operations, features, means, or instructions for receiving a repetition parameter indicating a number of times each beam in the set of beams may be repeated within each sub-window of the discovery window.

Some examples of the method, apparatuses, and non-transitory computer-readable medium described herein may further include operations, features, means, or instructions for mapping the plurality of SSB transmissions to the plurality of SSB candidates may be a further function of the repetition parameter.

In some examples of the method, apparatuses, and non-transitory computer-readable medium described herein, each beam may be repeated over consecutive SSB candidates of the plurality of SSB candidates within a given sub-window of the discovery window.

Some examples of the method, apparatuses, and non-transitory computer-readable medium described herein may further include operations, features, means, or instructions for transmitting one or more of: a request for the repetition parameter or a UE capability to support the repetition parameter, wherein the repetition parameter may be received responsive to the request for the repetition parameter or the UE capability to support the repetition parameter.

In some examples of the method, apparatuses, and non-transitory computer-readable medium described herein, monitoring the plurality of SSB candidates in accordance with the beam selected for each SSB candidate may include operations, features, means, or instructions for combining multiple SSB candidates within the discovery window, wherein the plurality of SSB candidates may be associated with a single beam of the set of beams.

In some examples of the method, apparatuses, and non-transitory computer-readable medium described herein, monitoring the plurality of SSB candidates in accordance with the beam selected for each SSB candidate may include operations, features, means, or instructions for discarding one of multiple SSB candidates within the discovery window, wherein the plurality of SSB candidates may be associated with a single beam of the set of beams.

In some examples of the method, apparatuses, and non-transitory computer-readable medium described herein, receiving the indication of the numerical quantity of beams may include operations, features, means, or instructions for receiving one or more of: a master information block (MIB) including the indication of the numerical quantity of beams, a system information block (SIB) including the indication of the numerical quantity of beams, a radio resource control (RRC) message including the indication of the numerical quantity of beams, or a physical broadcast channel (PBCH) transmission including the indication of the numerical quantity of beams.

In some examples of the method, apparatuses, and non-transitory computer-readable medium described herein, the indication of the numerical quantity of beams may be signaled by a subcarrier spacing (SCS) common field of the MIB or the PBCH transmission. In some examples of the method, apparatuses, and non-transitory computer-readable medium described herein, the indication of the numerical quantity of beams may be signaled by at least one bit in a SCS common field and at least one unused bit of MIB.

In some examples of the method, apparatuses, and non-transitory computer-readable medium described herein, the indication of the numerical quantity of beams may be signaled by a physical layer multiplexing of the PBCH transmission. In some examples of the method, apparatuses, and non-transitory computer-readable medium described herein, the indication of the numerical quantity of beams in the set of beams corresponds to the SSB transmissions during the discovery window in a licensed radio frequency spectrum band.

Some examples of the method, apparatuses, and non-transitory computer-readable medium described herein may further include operations, features, means, or instructions for transmitting one or more of: a request for the numerical quantity of beams or a UE capability to support the numerical quantity of beams, wherein the indication of the numerical quantity of beams may be received responsive to the request for the numerical quantity of beams or the UE capability to support the numerical quantity of beams.

A method for wireless communication at a network entity is described. The method may include transmitting an indication of a numerical quantity of beams in a set of beams associated with SSB transmissions during a discovery window in a licensed radio frequency spectrum band and transmitting one or more SSBs in accordance with the indication.

An apparatus for wireless communication at a network entity is described. The apparatus may include a processor, memory coupled with the processor, wherein the memory stores instructions. The instructions may be executable by the processor to cause the apparatus to transmit an indication of a numerical quantity of beams in a set of beams associated with SSB transmissions during a discovery window in a licensed radio frequency spectrum band and transmit one or more SSBs in accordance with the indication.

Another apparatus for wireless communication at a network entity is described. The apparatus may include means for transmitting an indication of a numerical quantity of beams in a set of beams associated with SSB transmissions during a discovery window in a licensed radio frequency spectrum band and means for transmitting one or more SSBs in accordance with the indication.

A non-transitory computer-readable medium storing code for wireless communication at a network entity is described. The code may include instructions executable by a processor to transmit an indication of a numerical quantity of beams in a set of beams associated with SSB transmissions during a discovery window in a licensed radio frequency spectrum band and transmit one or more SSBs in accordance with the indication.

In some examples of the method, apparatuses, and non-transitory computer-readable medium described herein, transmitting the indication of the numerical quantity of beams may include operations, features, means, or instructions for transmitting an express value of the numerical quantity of beams.

In some examples of the method, apparatuses, and non-transitory computer-readable medium described herein, transmitting the indication of the numerical quantity of beams may include operations, features, means, or instructions for transmitting a numerical value of sub-windows of the discovery window, each sub-window being associated with at least one SSB transmission over each beam of the set of beams, wherein the numerical quantity of beams may be implicit in the numerical value of sub-windows.

Some examples of the method, apparatuses, and non-transitory computer-readable medium described herein may further include operations, features, means, or instructions for transmitting a repetition parameter indicating a number of times each beam in the set of beams may be repeated within each sub-window of the discovery window.

In some examples of the method, apparatuses, and non-transitory computer-readable medium described herein, each beam may be repeated over consecutive SSB candidates of a plurality of SSB candidates within a given sub-window of the discovery window.

Some examples of the method, apparatuses, and non-transitory computer-readable medium described herein may further include operations, features, means, or instructions for receiving a request for the repetition parameter and transmitting the repetition parameter responsive to the request for the repetition parameter.

Some examples of the method, apparatuses, and non-transitory computer-readable medium described herein may further include operations, features, means, or instructions for receiving a UE capability to support the repetition parameter and transmitting the repetition parameter responsive to the UE capability to support the repetition parameter.

In some examples of the method, apparatuses, and non-transitory computer-readable medium described herein, transmitting the indication of the numerical quantity of beams may include operations, features, means, or instructions for transmitting one or more of: a MIB including the indication of the numerical quantity of beams, a SIB including the indication of the numerical quantity of beams, a RRC message including the indication of the numerical quantity of beams, or a PBCH transmission including the indication of the numerical quantity of beams.

Some examples of the method, apparatuses, and non-transitory computer-readable medium described herein may further include operations, features, means, or instructions for transmitting the MIB including a SCS common field including the indication of the numerical quantity of beams.

Some examples of the method, apparatuses, and non-transitory computer-readable medium described herein may further include operations, features, means, or instructions for performing a physical layer multiplexing of the PBCH transmission and transmitting the indication of the numerical quantity of beams in the PBCH transmission.

Some examples of the method, apparatuses, and non-transitory computer-readable medium described herein may further include operations, features, means, or instructions for receiving a request for the numerical quantity of beams and transmitting the indication of the numerical quantity of beams responsive to the request for the numerical quantity of beams.

Some examples of the method, apparatuses, and non-transitory computer-readable medium described herein may further include operations, features, means, or instructions for receiving a UE capability to support the numerical quantity of beams and transmitting the indication of the numerical quantity of beams responsive to the UE capability to support the numerical quantity of beams.

DETAILED DESCRIPTION

Figure 1:
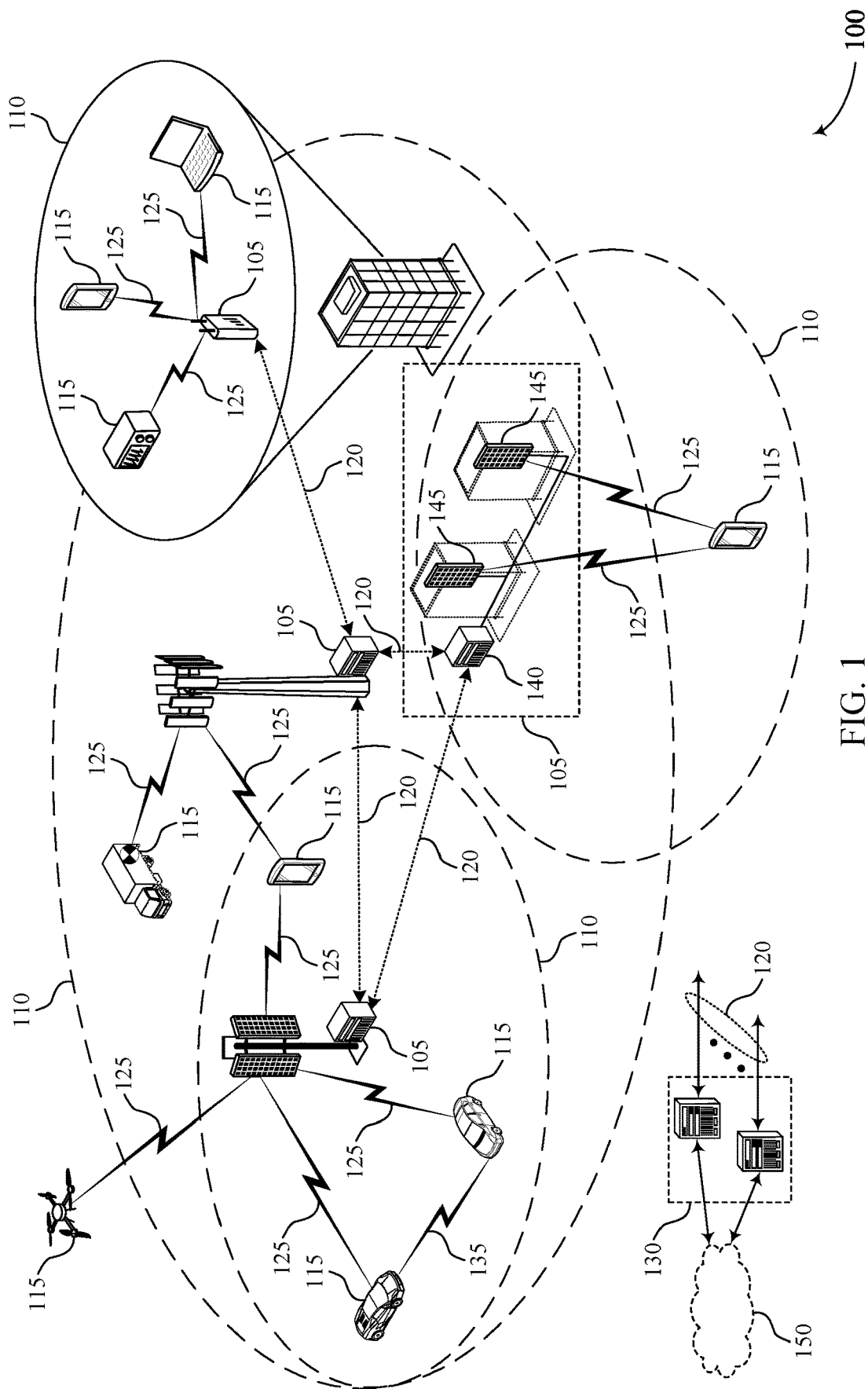
FIG. 1 illustrates an example of a wireless communications system that supports beam selection discovery window monitoring in accordance with aspects of the present disclosure.

A user equipment (UE) may communicate with one or more cells in a wireless communications system. The UE may operate in a shared spectrum channel, including unlicensed spectrum. The UE may perform cell discovery in order to initiate communications with a network entity. The network entity may transmit synchronization signal blocks (SSBs) or using physical broadcast channels (PBCHs). SSBs may correspond to different transmission beams of the network entity. The UE may determine a beam of a network entity based on reception of a SSB.

The network entity may transmit SSBs within different beams to one or more UEs. The network entity may transmit one or more SSBs within one beam. The network entity may transmit SSBs within a discovery window, such as but not limited to a discovery burst transmission (DRS) transmission window. The DRS window may begin from the first symbol of the first slot in a half of a frame. An increased number of candidate SSB occasions for a particular beam may increase reliability. For example, if a listen-before-talk (LBT) fails for transmission of one SSB occasion, another transmission opportunity or occasion may exist within the discovery or DRS window. For example, a DRS window may be 5 milliseconds (ms).

In some cases, a network entity (e.g., a base station or a component thereof) in a wireless communications system may support a number of beams. For example, a network entity may be able to support up to 64 SSB beams. The discovery window may remain the same length (e.g., 5 ms) with an increased number of beams for the system. With an increased number of beams (e.g., 64), and a same length DRS window, there may not be sufficient SSB candidate opportunities to provide redundant SSB transmissions (e.g., in the case of a failed LBT). For example, if up to 64 beams are supported, and there are 64 SSB candidate opportunities in a discovery window, each beam and correspond SSB may only be transmitted once in the discovery window, thus removing all redundancy. Thus, changes may be made to the DRS window configuration to provide multiple SSB candidate opportunities, in order to provide sufficient redundancies for SSB transmissions.

The number of candidate SSB opportunities per beam may be increased, by reducing the overall number of beams that may be supported in a wireless communications system. By decreasing the number of beams, and maintaining the number of SSB candidate opportunities (e.g., 64) in a same length discovery window (e.g., 5 ms), each beam, of the decreased number of beams, may correspond to an increased number of SSB candidate opportunities. For example, in a 5 ms discovery window with 64 SSB candidate opportunities, the number of beams may be reduced from 64 to 32, thus providing two SSB candidate opportunities for transmission by each beam.

In order to reduce the number of beams and increase redundancy such that a UE may effectively receive the SSB corresponding to one or more beams, signaling of the configuration change for the discovery window may be indicated to one or more UEs. A network entity may transmit an indication of the decreased number of beams to one or more UEs. A UE may derive beam indexes of network entity beams used to transmit SSBs as a modulo function. A UE may receive a SSB in a candidate opportunity or occasion, and the beam used to transmit the SSB may be derived by the UE as modulo (candidate SSB index, Q), where Q may be specified or signaled by the network entity. Q may be a repetition parameter. For example, SSBs may be transmitted every Q SSB opportunities in a discovery window. Q may be $N_{SSB}^{QCL}$. For example, Q may be 32. Thus, a same SSB of a same beam may be transmitted every 32 candidate occasions in a discovery window. Therefore, the number of beams may be implicitly indicated as 32, as the SSB is repeated twice in a discovery window with 64 SSB candidate slots available.

In another case, the number of sub-window may be specified as N. N may be indicated to a UE. For example, N may be indicated as 2. In this case, there may be two sub-windows within the discovery window, thereby dividing the discovery window of 64 SSB candidates in half. Thus, the number of beams may be implicitly indicated as 32, as each SSB corresponding to one beam may be transmitted once in each sub-window (e.g., twice in the discovery window).

In another case, SSB transmissions corresponding to a beam may be repeated M times, where M may be signaled. For example, if M is signaled as 2, then each SSB index may be repeated two times, for each occasion. For example, a SSB index may be transmitted in a SSB occasion 3 and SSB occasion 4.

The Q, N, or M parameters may be indicated to a UE via master information block (MIB) signaling, system information block (SIB) signaling, PBCH signaling, radio resource control (RRC) signaling, demodulation reference signal (DMRS) signaling, or a combination of these. Q, N, or M, or a combination, may be indicated to a serving cell, or to another cell.

Aspects of the disclosure are initially described in the context of wireless communications systems. Aspects of the disclosure are then described in the context of discovery window diagrams and process flows. Aspects of the disclosure are further illustrated by and described with reference to apparatus diagrams, system diagrams, and flowcharts that relate to beam selection discovery window monitoring.

FIG. 1 illustrates an example of a wireless communications system 100 that supports beam selection discovery window monitoring in accordance with aspects of the present disclosure. The wireless communications system 100 may include one or more network entities (e.g., one or more base stations 105), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The network entities (e.g., base stations 105) may be dispersed throughout a geographic area to form the wireless communications system 100 and may be devices in different forms or having different capabilities. In various examples, a network entity may be referred to as a network element, a mobility element, a radio access network (RAN) node, or network equipment, among other nomenclature. In some examples, network entities (e.g., base stations 105) and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities (e.g., base stations 105), or network equipment (e.g., core network nodes, relay devices, integrated access and backhaul (IAB) nodes, or other network equipment), as shown in FIG. 1.

In some examples, network entities (e.g., base stations 105) may communicate with the core network 130, or with one another, or both. For example, network entities (e.g., base stations 105) may interface with the core network 130 through one or more backhaul links 120 (e.g., via an S1, N2, N3, or other interface protocol). In some examples, network entities (e.g., base stations 105) may communicate with one another over the backhaul links 120 (e.g., via an X2, Xn, or other interface protocol) either directly (e.g., directly between network entities), or indirectly (e.g., via core network 130), or both. In some examples, network entities (e.g., base stations 105) may communicate with one another via a midhaul communication link (e.g., in accordance with a midhaul interface protocol) or a fronthaul communication link (e.g., in accordance with a fronthaul interface protocol), or any combination thereof. The backhaul communication links 120, midhaul communication links, or fronthaul communication links may be or include one or more wired links (e.g., an electrical link, an optical fiber link), one or more wireless links (e.g., a radio link, a wireless optical link), among other examples or various combinations thereof. A UE 115 may communicate with the core network 130 through a communication link.

One or more of the network entities described herein may include or may be referred to as a base stations 105 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity (e.g., base station 105) may be implemented in an aggregated (e.g., monolithic, standalone) base station architecture, which may be configured to utilize a protocol stack that is physically or logically integrated within a single network entity (e.g., a single RAN node, such as a base station 105).

In some examples, a network entity (e.g., base station 105) may be implemented in a disaggregated architecture (e.g., a disaggregated base station architecture, a disaggregated RAN architecture), which may be configured to utilize a protocol stack that is physically or logically distributed among two or more network entities, such as an IAB network, an open RAN (O-RAN) (e.g., a network configuration sponsored by the O-RAN Alliance), or a virtualized RAN (vRAN) (e.g., a cloud RAN (C-RAN)). For example, a network entity may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network entities (e.g., base stations 105) in a disaggregated RAN architecture may be co-located, or one or more components of the network entities (e.g., base stations 105) may be located in distributed locations (e.g., separate physical locations). In some examples, one or more network entities (e.g., base stations 105) of a disaggregated RAN architecture may be implemented as virtual units (e.g., a virtual CU (VCU), a virtual DU (VDU), a virtual RU (VRU)).

The split of functionality between a CU, a DU, and an RU is flexible and may support different functionalities depending upon which functions (e.g., network layer functions, protocol layer functions, baseband functions, RF functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1 c, F1 u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities (e.g., base stations 105) that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities (e.g., base stations 105) and/or IAB nodes may be partially controlled by each other. One or more IAB nodes may be referred to as a donor entity or an IAB donor. One or more DUs or one or more RUs may be partially controlled by one or more CUs associated with a donor network entity (e.g., a donor base station 105). The one or more donor network entities (e.g., donor base stations 105 or IAB donors) may be in communication with one or more additional network entities (e.g., additional base stations 105 or IAB nodes) via supported access and backhaul links (e.g., backhaul communication links 120). IAB nodes may include an IAB mobile termination (IAB-MT) controlled (e.g., scheduled) by DUs of a coupled IAB donor. An IAB-MT may include an independent set of antennas for relay of communications with UEs 115, or may share the same antennas (e.g., of an RU) of an IAB node used for access via the DU of the IAB node (e.g., referred to as virtual IAB-MT (vIAB-MT)). In some examples, the IAB nodes may include DUs that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities (e.g., base stations 105) and the network equipment including macro eNBs or gNBs, small cell eNBs or gNBs, or relay base stations, among other examples, as shown in FIG. 1.

The UEs 115 and the network entities (e.g., base stations 105) may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity (e.g., base station 105), or downlink transmissions from a network entity (e.g., base station 105) to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities, the UEs 115, etc.) may have hardware configurations that support communications over a particular carrier bandwidth or may be configurable to support communications over one of a set of carrier bandwidths. In some examples, the wireless communications system 100 may include network entities (e.g., base stations 105) or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities (e.g., base stations 105) or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity (e.g., base station 105) may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity (e.g., base station 105). For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity (e.g., a lower-powered base station 105), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity (e.g., base station 105) may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity (e.g., a base station 105, an RU) may be movable and therefore provide communication coverage for a moving geographic coverage area 110. In some examples, different geographic coverage areas 110 associated with different technologies may overlap, but the different geographic coverage areas 110 may be supported by the same network entity (e.g., base station 105). In other examples, the overlapping geographic coverage areas 110 associated with different technologies may be supported by different network entities (e.g., base stations 105). The wireless communications system 100 may include, for example, a heterogeneous network in which different types of the network entities (e.g., base stations 105) provide coverage for various geographic coverage areas 110 using the same or different radio access technologies.

The wireless communications system 100 may support synchronous or asynchronous operation. For synchronous operation, the network entities (e.g., base stations 105) may have similar frame timings, and transmissions from different network entities (e.g., base stations 105) may be approximately aligned in time. For asynchronous operation, the network entities (e.g., base stations 105) may have different frame timings, and transmissions from different network entities (e.g., base stations 105) may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity (e.g., base station 105) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity (e.g., base station 105). Other UEs 115 in such a group may be outside the geographic coverage area 110 of a network entity (e.g., base station 105) or be otherwise unable to receive transmissions from a network entity (e.g., base station 105). In some examples, groups of the UEs 115 communicating via D2D communications may utilize a one-to-many (1:M) system in which each UE 115 transmits to every other UE 115 in the group. In some examples, a network entity (e.g., base station 105) facilitates the scheduling of resources for D2D communications. In other cases, D2D communications are carried out between the UEs 115 without the involvement of a network entity (e.g., base station 105).

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities (e.g., base stations 105) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity (e.g., a base station 105), may include subcomponents such as an access network entity 140, which may be an example of an access node controller (ANC). Each access network entity 140 may communicate with the UEs 115 through one or more other access network transmission entities 145, such as an RU may also be referred to as a radio head, a smart radio head, an RRH, an RRU, or TRP. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities (e.g., base stations 105) and the UEs 115 may employ carrier sensing for collision detection and avoidance. In some examples, operations in unlicensed bands may be based at least in part on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity (e.g., base station 105) or a UE 115 may be equipped with multiple antennas, which may be used to employ techniques such as transmit diversity, receive diversity, multiple-input multiple-output (MIMO) communications, or beamforming. The antennas of a network entity (e.g., base station 105) or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity (e.g., base station 105) may be located in diverse geographic locations. A network entity (e.g., base station 105) may have an antenna array with a number of rows and columns of antenna ports that the network entity (e.g., base station 105) may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities (e.g., base stations 105) or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity such as base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity (e.g., base station 105) or a UE 115 may use beam sweeping techniques as part of beam forming operations. For example, a network entity (e.g., base station 105) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity (e.g., base station 105) multiple times in different directions. For example, the network entity (e.g., base station 105) may transmit a signal according to different beamforming weight sets associated with different directions of transmission. Transmissions in different beam directions may be used to identify (e.g., by a transmitting device, such as a network entity (e.g., base station 105), or by a receiving device, such as a UE 115) a beam direction for later transmission or reception by the network entity (e.g., base station 105).

Some signals, such as data signals associated with a particular receiving device, may be transmitted by a network entity (e.g., base station 105) in a single beam direction (e.g., a direction associated with the receiving device, such as a UE 115). In some examples, the beam direction associated with transmissions along a single beam direction may be determined based at least in part on a signal that was transmitted in one or more beam directions. For example, a UE 115 may receive one or more of the signals transmitted by the network entity (e.g., base station 105) in different directions and may report to the network entity (e.g., base station 105) an indication of the signal that the UE 115 received with a highest signal quality or an otherwise acceptable signal quality.

In some examples, transmissions by a device (e.g., by a network entity such as base station 105 or a UE 115) may be performed using multiple beam directions, and the device may use a combination of digital precoding or radio frequency beamforming to generate a combined beam for transmission (e.g., from a network entity such as base station 105 to a UE 115). The UE 115 may report feedback that indicates precoding weights for one or more beam directions, and the feedback may correspond to a configured number of beams across a system bandwidth or one or more sub-bands. The network entity (e.g., base station 105) may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity (e.g., base station 105), a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity (e.g., base station 105), such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based at least in part on listening according to different receive configuration directions (e.g., a beam direction determined to have a highest signal strength, highest signal-to-noise ratio (SNR), or otherwise acceptable signal quality based at least in part on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity (e.g., base station 105) or a core network 130 supporting radio bearers for user plane data. At the physical layer, transport channels may be mapped to physical channels.

The UEs 115 and the network entities (e.g., base stations 105) may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform cell discovery in a window by monitoring for and receiving SSBs from a base station. The UE 115 may receive an indication of a numerical quantity of beams in a set of beams associated with SSB transmission during a discovery window. The UE 115 may map a set of SSB transmissions within the discovery window to a set of SSB candidates within the discovery window using the receive indication of the numerical quantity of beams, where the set of SSB candidates is a subset of a total number of SSB candidates within the discovery window. The UE 115 may select, for each SSB candidate of the set of SSB candidates associated with the discovery window, a beam from the set of beams for monitoring each of the SSB candidates, where the beam is selected as a function of an index of the SSB candidate and the numerical quantity of beams. The UE 115 may monitor the SSB candidates in accordance with the beam selected for each SSB candidate. The UE may then receive one or more SSBs in accordance with the monitoring.

Figure 2:
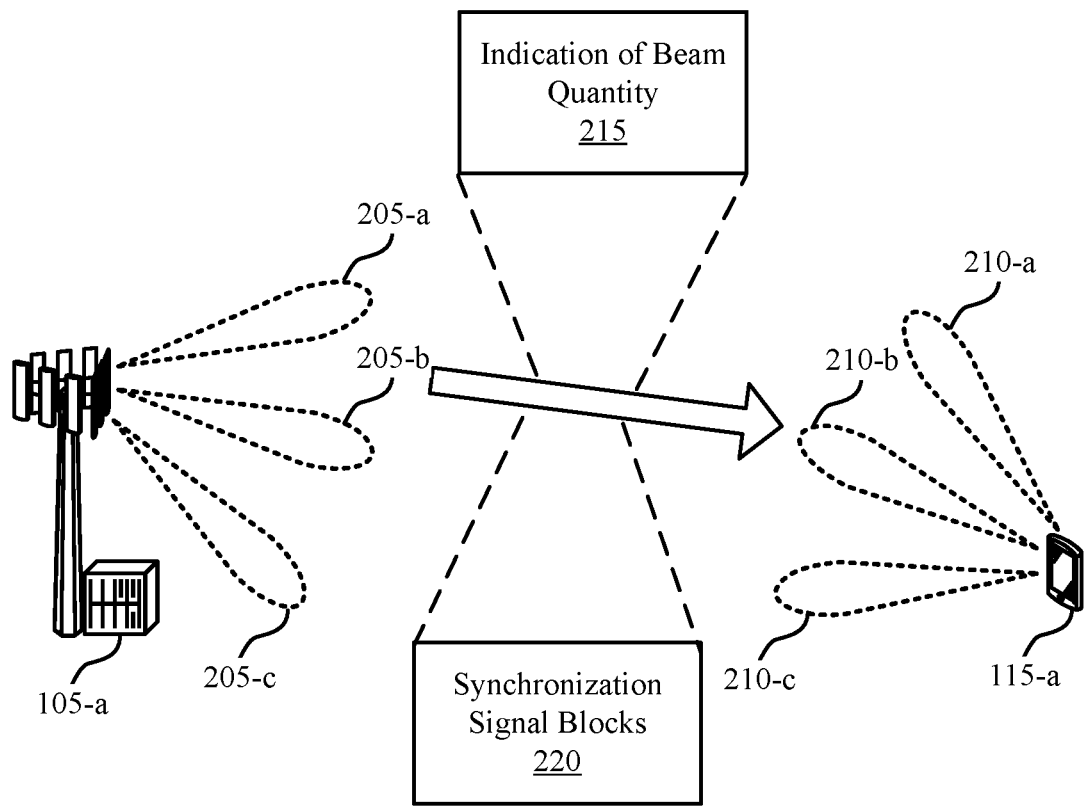
FIG. 2 illustrates an example of a wireless communications system that supports beam selection discovery window monitoring in accordance with aspects of the present disclosure.

FIG. 2 illustrates an example of a wireless communications system 200 that supports beam selection discovery window monitoring in accordance with aspects of the present disclosure. Wireless communications system 200 may include UE 115-a, which may be an example of a UE 115 as described with respect to FIG. 1. Wireless communications system 200 may also include base station 105-a, which may be an example of a network entity (e.g., base station 105) as described with respect to FIG. 1. Base station 105-a may communicate with UE 115-a and other UEs 115 using beams 205, including beams 205-a, 205-b, and 205-c. UE 1150a may communicate with base station 105-a using beams 210-a, 210-b, and 210-c. Base station 105-a and UE 115-a may use beams 205 and 210 to transmit and receive wireless communications signals.

Each beam 205 of base station 105-a may correspond to a SSB or a quasi-colocation (QCL) parameter. Base station 105-a may transmit SSBs of each beam 205 within SSB occasions in a discovery window, in order to indicate beam information to UE 115-a. UE 115-a may receive the SSB, and determine beam information based on the SSB received during a discovery window (e.g., in a licensed radio frequency spectrum band or in an unlicensed radio frequency spectrum band). A discovery window may be of a particular length, such as 5 ms. The discovery window may include a set number of SSB candidate occasions, such as 64 occasions. Base station 105-a may transmit, using a beam, the SSB corresponding to the beam in each of the SSB occasions. In some systems, base station 105-a may communicate using up to a maximum number of beams (e.g., 64), and the same number of SSBs (e.g., 64). Therefore, if the number of candidate SSB opportunities is the same as the number of beams, each SSB for each beam may only be transmitted once in the discovery window.

While each SSB may be transmitted, there may not be redundancy in this configuration, which may increase latency and decrease communications efficiency, as UE 115-a may miss some SSBs. Therefore, base station 105-a may decrease the number of beams 205 used in order to increase the number of times each SSB of the beam is transmitted. For example, base station 105-a may transmit using 32 beams instead of 64 beams, such that each SSB for each beam may be transmitted twice within a discovery window.

UE 115-*a* may map each SSB received in each candidate opportunity to a beam of base station 105-*a*, in order to efficiently communicate with base station 105-*a*. In order for UE 115-*a* to correctly map each SSB candidate opportunity to the SSB of each beam, UE 115-*a* may need to be aware of the number of beams used by base station 105-*a*, or be aware of the repetition configuration used by base station 105-*a*. Thus, base station 105-*a* may transmit, to UE 115-*a*, and indication of beam quantity 215. Indication of beam quantity 215 may be transmitted to UE 115-*a* in MIB signaling, SIB signaling, RRC signaling, DMRS signaling, PBCH layer 1 multiplexing, or a DMRS sequence. New bits may be defined in these signals for the indication of beam quantity 215. Further, unused bits in PBCH or MIB signaling may be used. For example, the SCS common bits may be used to signal the indication of beam quantity 215 in cases where the SSB and CORESET0 is the same. In some examples, any combination of new bits, unused bits, and SCS common bits may be used to indicate beam quantity 215 in MIB signaling, SIB signaling, RRC signaling, DMRS signaling, PBCH layer 1 multiplexing, or a DMRS sequence.

Indication of beam quantity 215 may include an implicit or explicit indication of the number of beams used by base station 105-*a*. Indication of beam quantity 215 may include an explicit or express indication of the number of beams. Indication of beam quantity 215 may also implicitly indicate the number of beams, by expressly or explicitly indicating parameters Q, N, or M, or a combination of these. Parameter Q may be a repetition parameter, where SSB transmissions or QCL transmissions (each corresponding to a single beam) may be repeated every Q. For example, Q may be 32, where (in the case that there are 64 SSB candidate opportunities in a discovery window), each SSB may be transmitted every 32 SSB candidate opportunities. Therefore, each SSB may be transmitted twice, thus corresponding to 32 beams, in this example. Thus, the number of beams (e.g., 32) may be implicitly indicated by Q. UE 115-*a* may determine the beam indexed as modulo(candidate SSB index, Q).

Indication of beam quantity 215 may also include an indication of parameter N. Parameter N may be an indication of a number of sub-windows. For example, N may be indicated as 2. In this case, there may be two sub-windows within the discovery window, thereby dividing the discovery window of 64 SSB candidates in half. Thus, the number of beams may be implicitly indicated as 32, as each SSB corresponding to one beam may be transmitted once in each sub-window (e.g., twice in the discovery window).

In another case, indication of beam quantity 215 may include an indication of a M parameter. SSB transmissions corresponding to a beam may be repeated M times. For example, if M is signaled as 2, then there may be 32 beams used in the wireless communication configuration. UE 115-*a* may derive the beam indexes as modulo(floor(candidate SSB index/M), Q). M and Q may be specified or signaled.

In the example of licensed spectrum, the indication of Q or N may allow for more than one SSB candidate per beam. In these cases, beams may also be repeated every Q. For example, in cases where N is indicated as 2 (such that Q is 32), two SSBs may be transmitted on the first or the second candidate SSB occasion. UE 15-*a* may then combine the SSBs to improve coverage. In other cases, at least one SSB may be transmitted on one candidate SSB. The other candidate SSBs for the SSB may or may not include a SSB of the SSB. For example, if N is indicated as 2, and Q is 32, only one SSB may be transmitted on the first or the second candidate SSB occasions.

Based on the parameter signaling, base station 105-*a* may transmit SSBs in SSBs candidate occasions for each beam 205. UE 115-*a* may monitor for and receive SSBs 220 according to the received indication of beam quantity 215. The techniques described may also be used in cases with more or fewer SSB candidate opportunities than 64, more or fewer standard beams than 64, and a different length discovery window.

Figure 3:
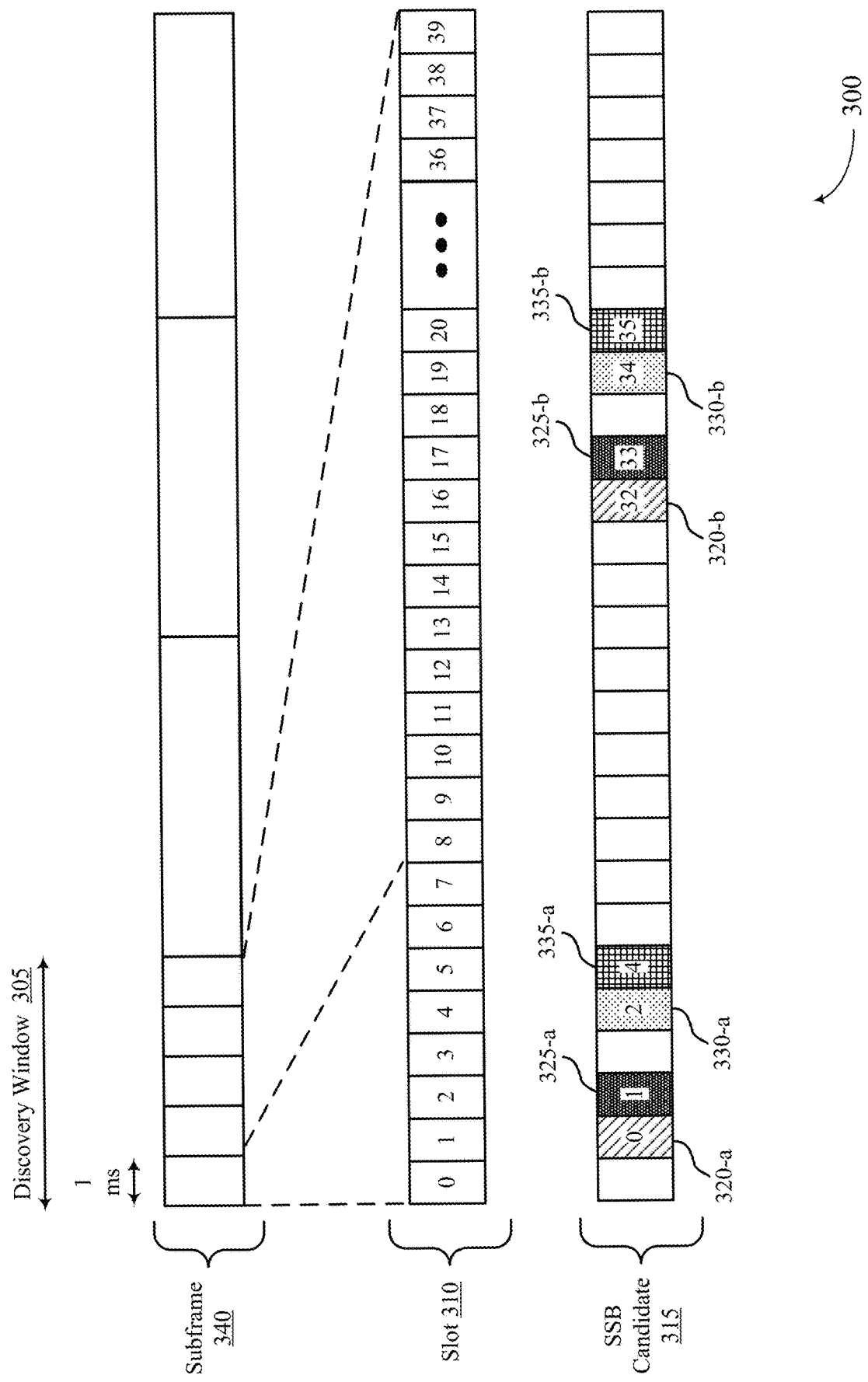
FIG. 3 illustrates an example of a discovery window diagram that supports beam selection discovery window monitoring in accordance with aspects of the present disclosure.

FIG. 3 illustrates an example of a discovery window diagram 300 that supports beam selection discovery window monitoring in accordance with aspects of the present disclosure. Discovery window diagram 300 may include subframe 340, which may include a discovery window 305 (e.g., a DRX window). The discovery window 305 may be 5 ms in length in some examples. Each slot of the discovery window may be 1 ms. A 1 ms slot 310 of the discovery window may be broken up into 8 sub-slots (e.g., 0-7, 8-5, etc.) Thus, a the 5 ms discovery window may include 40 subslots (0-39). A network entity (e.g., base station 105) may transmit a SSB index in each SSB candidate 315. The SCS in this example may be 120 kHz.

The base station 105 may transmit an indication of a beam quantity to a UE 115. The indication of the beam quantity may be an explicit indication of a beam quantity, or may include an indication of one or more of parameters Q, N, or M. Discovery window diagram 300 may be an example of a case where the indication of beam quantity included an indication of a Q of 32, and an N of 2. Thus, there are two sub-window in the discovery window 305. Additionally, or alternatively, each SSB, corresponding to a beam, transmitted by the base station 105 may be transmitted two times within discovery window 305. Therefore, the base station 105 may be operating with 32 beams.

For example, the base station 105 may transmit a first SSB index 320-*a* of a first beam in SSB candidate 0. The base station 105 may transmit a second instance of the same SSB index 320-*b* for the first beam in SSB candidate occasion 32. The base station 105 may transmit same SSB indexes 325-*a* and 325-*b* for a second beam in SSB candidate slots 1 and 33. The base station 105 may transmit same SSB indexes 330-*a* and 330-*b* for a third beam in SSB candidate occasions 2 and 34. The base station 105—may transmit same SSB indexes 335-*a* and 335-*b* for a fourth beam in SSB candidate occasions in 4 and 35.

A UE 115 may receive indication of the beam quantity including the indications of one or more of Q, N, or M. The UE 115 may monitor that SSB candidate occasions for reception of the SSB index. UE 115 may map each SSB candidate slot to each received SSB transmission. UE 115 may determine beams corresponding to each received SSB transmission according to the received indication of beam quantity or one or more of Q, N, or M, or a combination of these.

Figure 4:
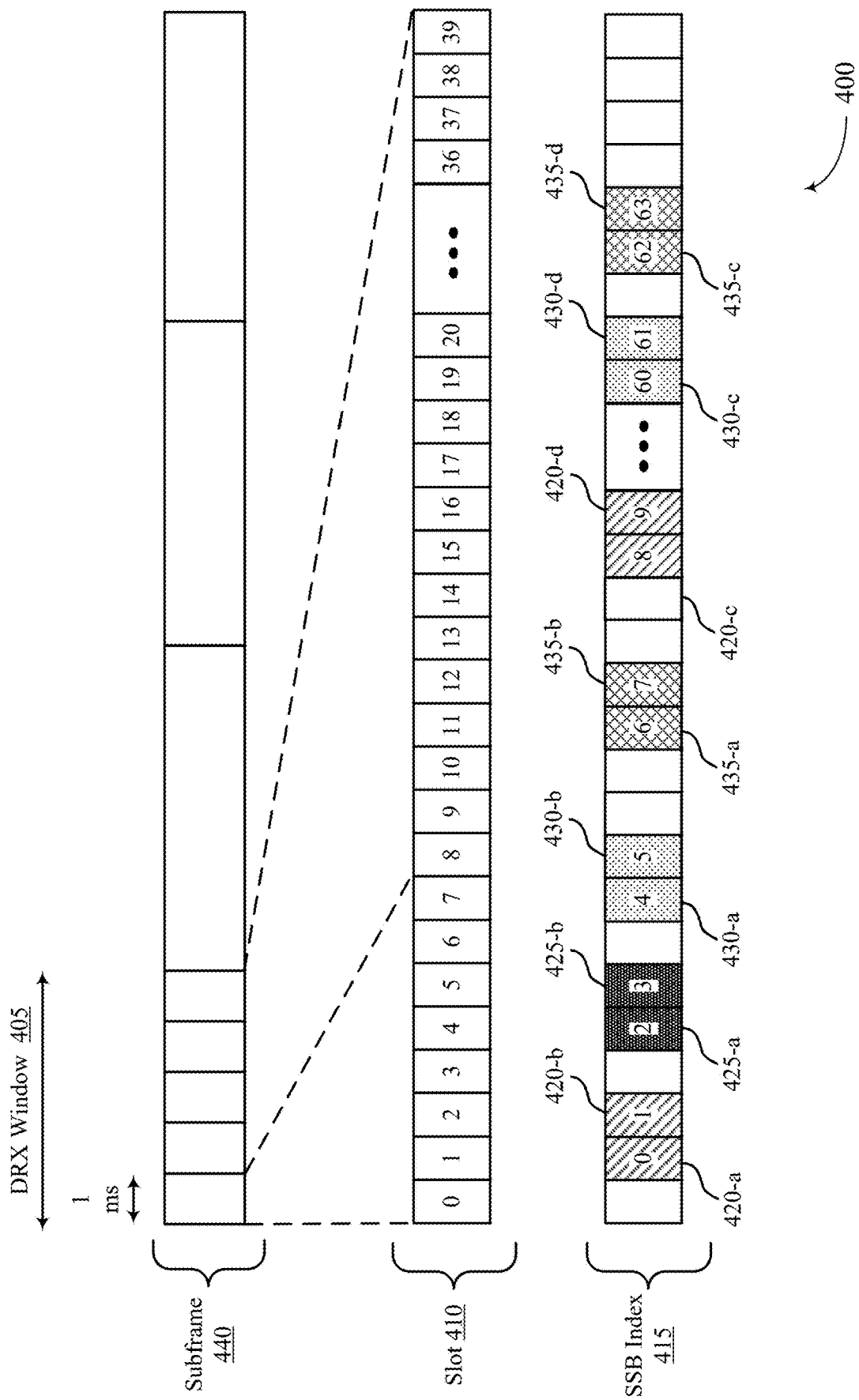
FIG. 4 illustrates an example of a discovery window diagram that supports beam selection discovery window monitoring in accordance with aspects of the present disclosure.

FIG. 4 illustrates an example of a discovery window diagram 400 that supports beam selection discovery window monitoring in accordance with aspects of the present disclosure. Discovery window diagram 400 may include subframe 440, which may include a discovery window 405 (e.g., a DRX window). The discovery window 405 may be 5 ms in length in some examples. Each slot of the discovery window may be 1 ms. A 1 ms slot 410 of the discovery window may be broken up into 8 sub-slots (e.g., 0-7, 8-5, etc.) Thus, a the 5 ms discovery window may include 40 subslots (0-39). A network entity (e.g., base station 105) may transmit a SSB index in each SSB candidate 415. The SCS in this example may be 120 kHz.

The base station 105 may transmit an indication of a beam quantity to a UE 115. The indication of the beam quantity may be an explicit indication of a beam quantity, or may include an indication of one or more of parameters Q, N, or M. Discovery window diagram 400 may be an example of a case where the indication of beam quantity included an indication of a Q of 4, and an M of 2. Thus, SSB indices transmissions may be repeated every 4th beam, and SSB indices may be repeated twice in a row (e.g., back to back). Additionally, or alternatively, each SSB, corresponding to a beam, transmitted by the base station 105 may be transmitted two times within discovery window 405. Therefore, the base station 105 may be operating with 4 beams.

For example, the base station 105 may transmit a first SSB index 420-a of a first beam in SSB candidate 0. The base station 105 may transmit a second instance of the same SSB index 420-b for the first beam in SSB candidate occasion 1. The base station may also transmit repetitions of SSB index 420-c and 420-d in SSB candidate opportunities 8 and 9. The base station 105 may transmit same SSB indexes 425-a and 425-b for a second beam in SSB candidate slots 2 and 3. The base station 105 may transmit same SSB indexes 430-a and 430-b for a third beam in SSB candidate occasions 4 and 5. The base station may also transmit repetitions of SSB index 430-c and 430-d in SSB candidate opportunities 60 and 61. The base station 105 may transmit same SSB indexes 435-a and 435-b for a fourth beam in SSB candidate occasions in 6 and 7. The base station may also transmit repetitions of SSB index 435-c and 435-d in SSB candidate opportunities 60 and 61. Thus, the pattern according to a Q of 4 and a M of 2 is repeated for 64 SSB occasions (e.g., SSB occasions 0-63)

A UE 115 may receive indication of the beam quantity including the indications of one or more of Q, N, or M. The UE 115 may monitor that SSB candidate occasions for reception of the SSB index. UE 115 may map each SSB candidate slot to each received SSB transmission. UE 115 may determine beams corresponding to each received SSB transmission according to the received indication of beam quantity or one or more of Q, N, or M, or a combination of these.

Figure 5:
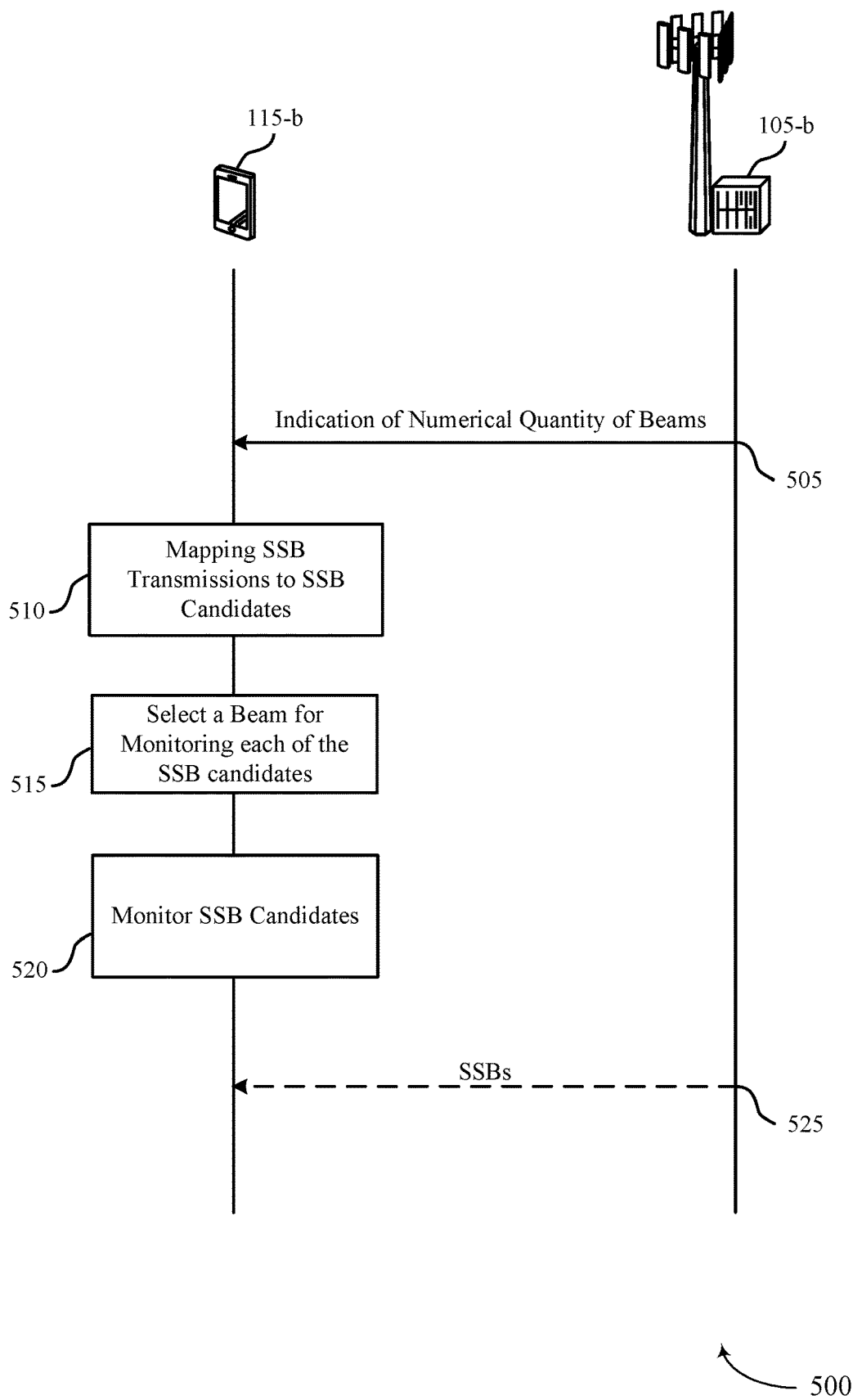
FIG. 5 illustrates an example of a process flow that supports beam selection discovery window monitoring in accordance with aspects of the present disclosure.

FIG. 5 illustrates an example of a process flow 500 that supports beam selection discovery window monitoring in accordance with aspects of the present disclosure. Process flow 500 includes UE 115-b, which may be an example of a UE 115 as described with respect to FIGS. 1 and 2. Process flow 500 also includes base station 105-b, which may be an example of a network entity (e.g., base station 105) as described with respect to FIGS. 1 and 2. UE 115-b may perform an initial cell search in order to establish communication with base station 105-b.

At 505, UE 115-b may receive an indication of a numerical quantity of beams in a set of beams associated with SSB transmissions during a discovery window. UE 115-b may receive an express value of the numerical quantity of beams. UE 115-b may receive a numerical value of sub-windows (e.g., parameter N) of the discovery window, each sub-window being associated with at least one SSB transmission over each beam of the set of beams. In these cases, the numerical quantity of beams is implicit in the numerical value of sub-windows.

In some cases, UE 115-b may receive one or more of a MIB including the indication of the numerical quantity of beams, a SIB including the indication of the numerical quantity of beams, a RRC message including the indication of the numerical quantity of beams, or a PBCH including the indication of the numerical quantity of beams. In some cases, the indication of the numerical quantity of beams may be signaled by a SCS common field of the MIB of the PBCH transmission. The indication of the numerical quantity of beams may also be signaled by a PHY layer multiplexing of the PBCH transmission.

In some cases, base station 105-b may perform a PHY layer multiplexing of the PBCH transmission, and base station 105-b may transmit the indication of the numerical quantity of beams in the PBCH transmission.

In some cases, UE 115-b may receive a repetition parameter indicating a number of times each beam in the set of beams is repeated within each sub-window of the discovery window (e.g., parameter M).

In some cases, UE 115-b may transmit one or more of a request for the repetition parameter or a UE capability of UE 115-b to support the repetition parameter, where the repetition parameter may be received responsive to the request for the repetition parameter of the UE capability to support the repetition parameter.

In some cases, UE 115-b may transmit one or more of a request for the numerical quantity of beams of a UE capability of UE 115-b to support the numerical quantity of beams, wherein the indication of the numerical quantity of beams may be received responsive to the request for the numerical quantity of beams or the UE capability to support the numerical quantity of beams.

At 510, UE 115-b may map a set of SSB transmissions within the discovery window (e.g., a DRS window) to a set of SSB candidates within the discovery window using the received indication of the numerical quantity of beams, where the set of SSB candidates is a subset of a total number of SSB candidates within the discovery window.

In cases where UE 115-b receives the repetition parameter, the mapping of the set of SSB transmissions to the set of SSB candidates may be a further function of the repetition parameter.

In some cases, each beam is repeated over consecutive SSB candidates of the set of SSB candidates within a given sub-window of the discovery window.

At 515, UE 115-b may select for each SSB candidate of the set of SSB candidates associated with the discovery window, a beam from the set of beams for monitoring each of the SSB candidates, where the beam is selected as a function of an index of the SSB candidate and the numerical quantity of beams.

At 520, UE 115-b may monitor the set of SSB candidates in accordance with the beam selected for each SSB candidate. In some cases, UE 115-b may combine multiple SSB candidates within the discovery window, where the set of SSB candidates may be associated with a single beam of the set of beams. In some cases, UE 115-b may discard one or multiple SSB candidates within the discovery window, where the set of SSB candidates may be associated with a single beam of the set of beams.

At 525, UE 115-b may receive one or more SSBs in accordance with the monitoring. Base station 105-b may transmit one or more SSBs in accordance with the indication of the numerical quantity of beams.

Figure 6:
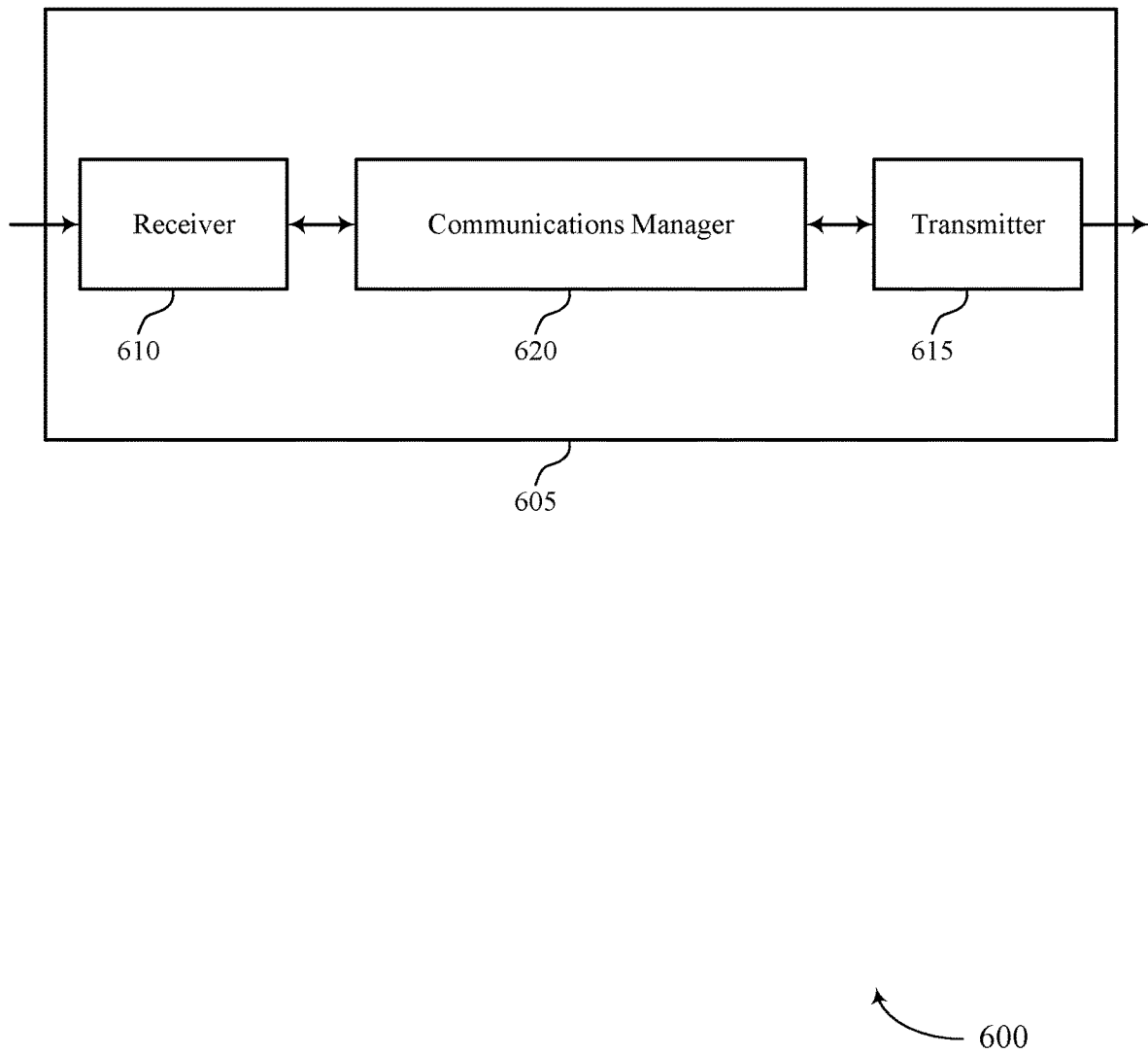
FIGS. 6 and 7 show block diagrams of devices that support beam selection discovery window monitoring in accordance with aspects of the present disclosure.

FIG. 6 shows a block diagram 600 of a device 605 that supports beam selection discovery window monitoring in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam selection discovery window monitoring). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam selection discovery window monitoring). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam selection discovery window monitoring as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving an indication of a numerical quantity of beams in a set of beams associated with SSB transmissions during a discovery window. The communications manager 620 may be configured as or otherwise support a means for mapping a plurality of SSB transmissions within the discovery window to a plurality of synchronization signal block candidates within the discovery window using the received indication of the numerical quantity of beams, wherein the plurality of synchronization signal block candidates is a subset of a total number of SSB candidates within the discovery window. The communications manager 620 may be configured as or otherwise support a means for selecting, for each SSB candidate of the plurality of SSB candidates associated with the discovery window, a beam from the set of beams for monitoring each of the SSB candidate, wherein the beam is selected as a function of an index of the SSB candidate and the numerical quantity of beams. The communications manager 620 may be configured as or otherwise support a means for monitoring the plurality of SSB candidates in accordance with the beam selected for each SSB candidate. The communications manager 620 may be configured as or otherwise support a means for receiving one or more SSBs in accordance with the monitoring.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving redundancy opportunities of SSB transmissions in order to increase communications efficiency and decrease latency. The device 605 may receive an indication of a repetition configuration of a set of beams from a base station, and the device 605 may use the configuration to efficiently map SSB candidate occasions to received SSB indexes and the corresponding beams.

Figure 7:
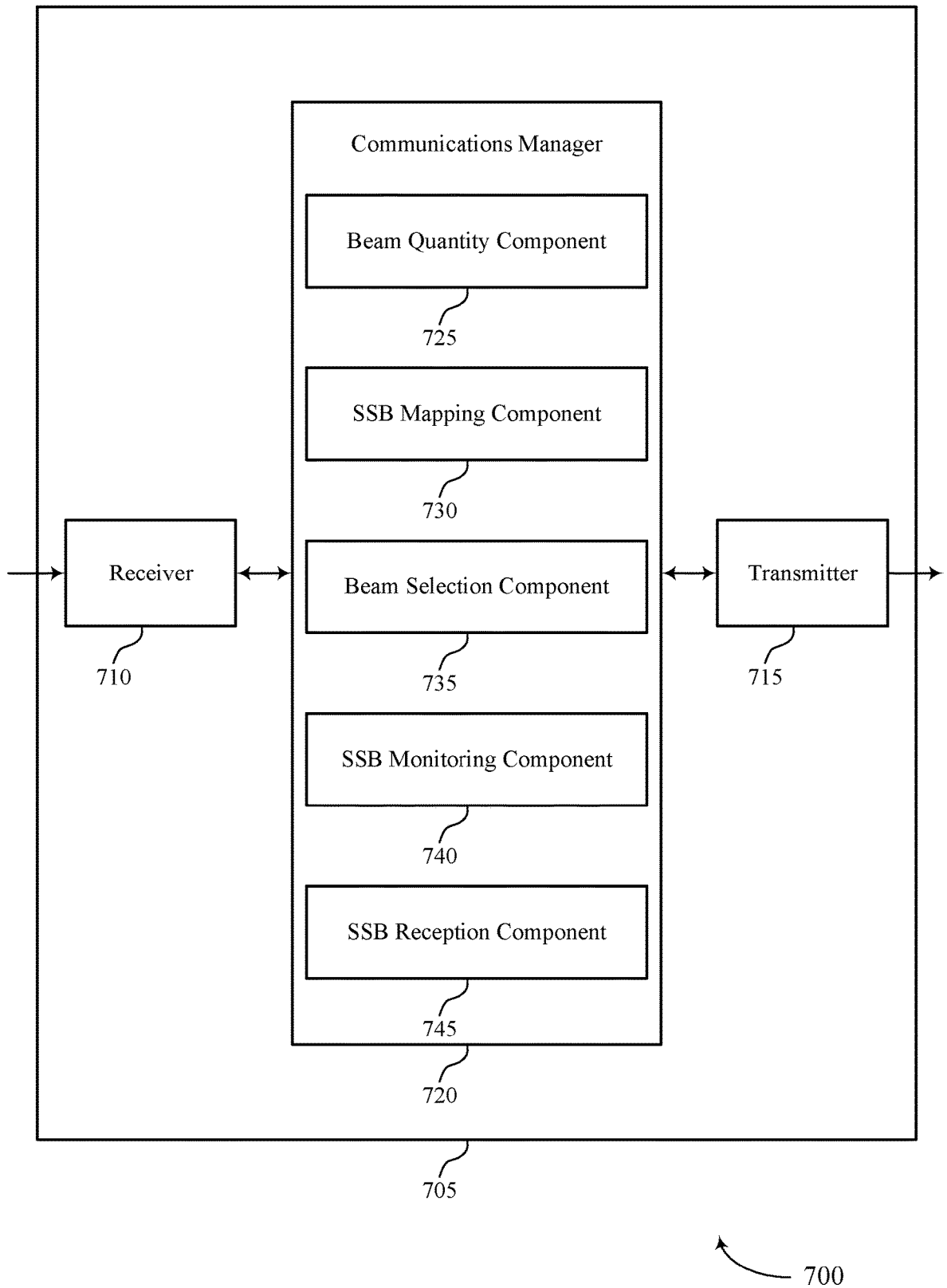

FIG. 7 shows a block diagram 700 of a device 705 that supports beam selection discovery window monitoring in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam selection discovery window monitoring). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam selection discovery window monitoring). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam selection discovery window monitoring as described herein. For example, the communications manager 720 may include a beam quantity component 725, an SSB mapping component 730, a beam selection component 735, an SSB monitoring component 740, an SSB reception component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The beam quantity component 725 may be configured as or otherwise support a means for receiving an indication of a numerical quantity of beams in a set of beams associated with SSB transmissions during a discovery window. The SSB mapping component 730 may be configured as or otherwise support a means for mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window. The beam selection component 735 may be configured as or otherwise support a means for selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams. The SSB monitoring component 740 may be configured as or otherwise support a means for monitoring the plurality of SSB candidates in accordance with the beam selected for each SSB candidate. The SSB reception component 745 may be configured as or otherwise support a means for receiving one or more SSBs in accordance with the monitoring.

Figure 8:
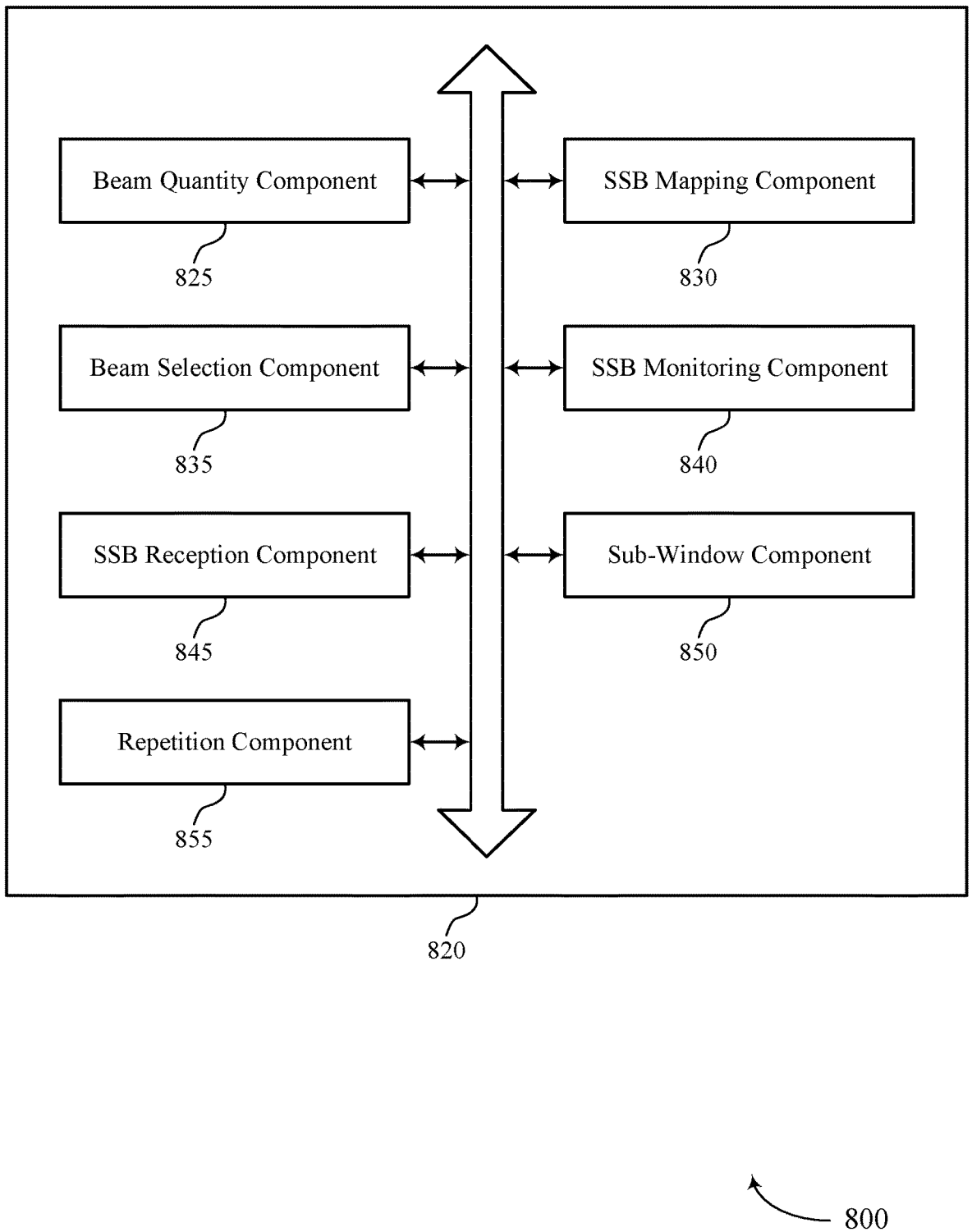
FIG. 8 shows a block diagram of a communications manager that supports beam selection discovery window monitoring in accordance with aspects of the present disclosure.

FIG. 8 shows a block diagram 800 of a communications manager 820 that supports beam selection discovery window monitoring in accordance with aspects of the present disclosure. The communications manager 820 may be an example of aspects of a communications manager 620, a communications manager 720, or both, as described herein. The communications manager 820, or various components thereof, may be an example of means for performing various aspects of beam selection discovery window monitoring as described herein. For example, the communications manager 820 may include a beam quantity component 825, an SSB mapping component 830, a beam selection component 835, an SSB monitoring component 840, an SSB reception component 845, a sub-window component 850, a repetition component 855, or any combination thereof. Each of these components may communicate, directly or indirectly, with one another (e.g., via one or more buses).

The communications manager 820 may support wireless communication at a UE in accordance with examples as disclosed herein. The beam quantity component 825 may be configured as or otherwise support a means for receiving an indication of a numerical quantity of beams in a set of beams associated with SSB transmissions during a discovery window. The SSB mapping component 830 may be configured as or otherwise support a means for mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window. The beam selection component 835 may be configured as or otherwise support a means for selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams. The SSB monitoring component 840 may be configured as or otherwise support a means for monitoring the plurality of SSB candidates in accordance with the beam selected for each SSB candidate. The SSB reception component 845 may be configured as or otherwise support a means for receiving one or more SSBs in accordance with the monitoring.

In some examples, to support receiving the indication of the numerical quantity of beams, the beam quantity component 825 may be configured as or otherwise support a means for receiving an express value of the numerical quantity of beams.

In some examples, to support receiving the indication of the numerical quantity of beams, the sub-window component 850 may be configured as or otherwise support a means for receiving a numerical value of sub-windows of the discovery window, each sub-window being associated with at least one SSB transmission over each beam of the set of beams, wherein the numerical quantity of beams is implicit in the numerical value of sub-windows.

In some examples, the repetition component 855 may be configured as or otherwise support a means for receiving a repetition parameter indicating a number of times each beam in the set of beams is repeated within each sub-window of the discovery window.

In some examples, mapping the plurality of SSB transmissions to the plurality of SSB candidates is a further function of the repetition parameter.

In some examples, each beam is repeated over consecutive SSB candidates of the plurality of SSB candidates within a given sub-window of the discovery window.

In some examples, the repetition component 855 may be configured as or otherwise support a means for transmitting one or more of: a request for the repetition parameter or a UE capability to support the repetition parameter, wherein the repetition parameter is received responsive to the request for the repetition parameter or the UE capability to support the repetition parameter.

In some examples, to support monitoring the plurality of SSB candidates in accordance with the beam selected for each SSB candidate, the SSB mapping component 830 may be configured as or otherwise support a means for combining multiple SSB candidates within the discovery window, wherein the plurality of SSB candidates is associated with a single beam of the set of beams.

In some examples, to support monitoring the plurality of SSB candidates in accordance with the beam selected for each SSB candidate, the SSB mapping component 830 may be configured as or otherwise support a means for discarding one of multiple SSB candidates within the discovery window, wherein the plurality of SSB candidates are associated with a single beam of the set of beams.

In some examples, to support receiving the indication of the numerical quantity of beams, the beam quantity component 825 may be configured as or otherwise support a means for receiving one or more of: a MIB including the indication of the numerical quantity of beams, a SIB including the indication of the numerical quantity of beams, a RRC message including the indication of the numerical quantity of beams, or a PBCH transmission including the indication of the numerical quantity of beams.

In some examples, the indication of the numerical quantity of beams is signaled by a SCS common field of the MIB or the PBCH transmission. In some examples, the indication of the numerical quantity of beams may be signaled by at least one bit in a SCS common field and at least one unused bit of MIB.

In some examples, the indication of the numerical quantity of beams is signaled by a physical layer multiplexing of the PBCH transmission. In some examples, the indication of the numerical quantity of beams in the set of beams corresponds to the SSB transmissions during the discovery window in a licensed radio frequency spectrum band.

In some examples, the beam quantity component 825 may be configured as or otherwise support a means for transmitting one or more of: a request for the numerical quantity of beams or a UE capability to support the numerical quantity of beams, wherein the indication of the numerical quantity of beams is received responsive to the request for the numerical quantity of beams or the UE capability to support the numerical quantity of beams.

Figure 9:
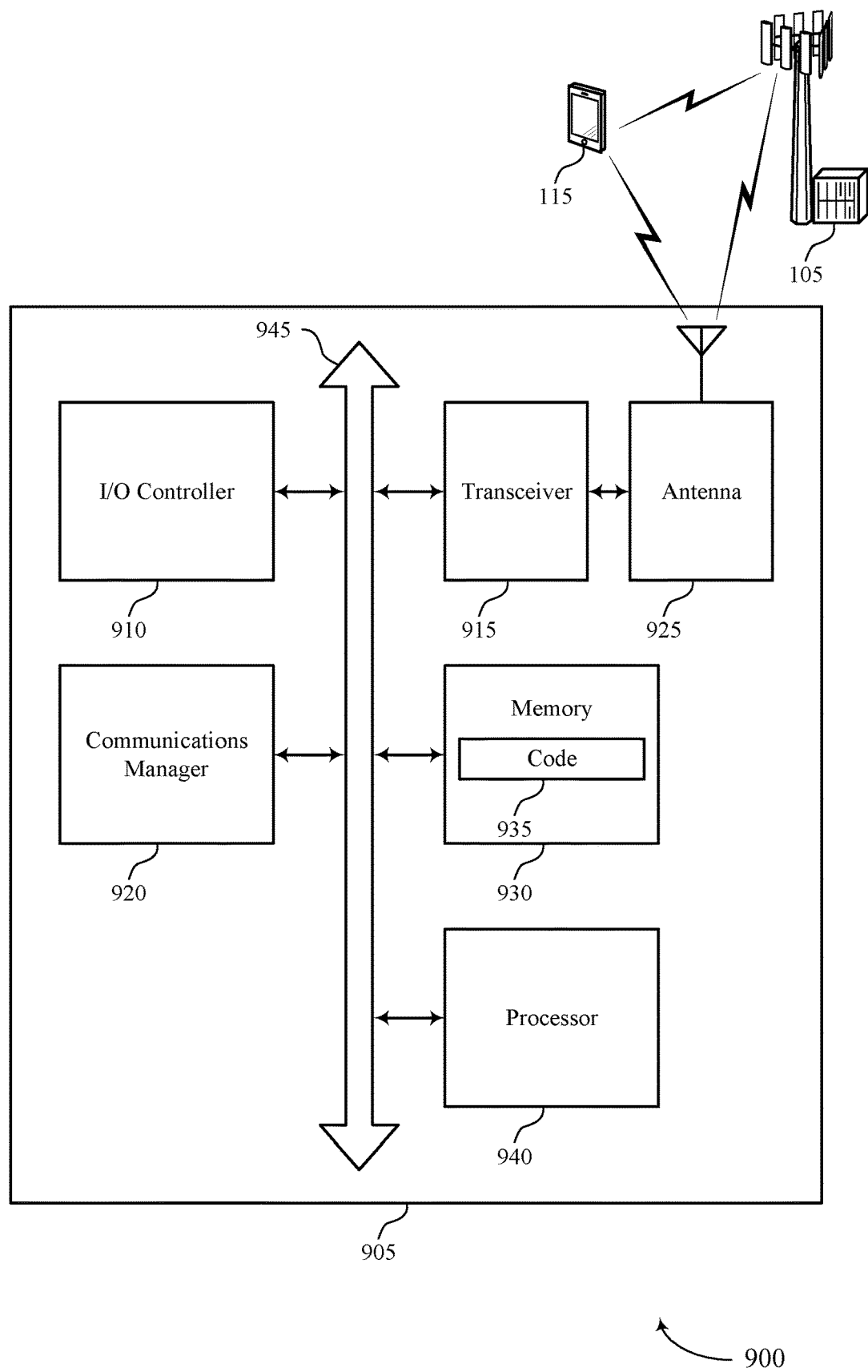
FIG. 9 shows a diagram of a system including a device that supports beam selection discovery window monitoring in accordance with aspects of the present disclosure.

FIG. 9 shows a diagram of a system 900 including a device 905 that supports beam selection discovery window monitoring in accordance with aspects of the present disclosure. The device 905 may be an example of or include the components of a device 605, a device 705, or a UE 115 as described herein. The device 905 may communicate wirelessly with one or more network entities (e.g., base stations 105), UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam selection discovery window monitoring). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving an indication of a numerical quantity of beams in a set of beams associated with SSB transmissions during a discovery window. The communications manager 920 may be configured as or otherwise support a means for mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window. The communications manager 920 may be configured as or otherwise support a means for selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams. The communications manager 920 may be configured as or otherwise support a means for monitoring the plurality of SSB candidates in accordance with the beam selected for each SSB candidate. The communications manager 920 may be configured as or otherwise support a means for receiving one or more SSBs in accordance with the monitoring.

By including or configuring the communications manager 920 in accordance with examples as described herein, the device 905 may support techniques for improving redundancy opportunities of SSB transmissions in order to increase communications efficiency and decrease latency. The device 905 may receive an indication of a repetition configuration of a set of beams from a network entity, and the device 905 may use the configuration to efficiently map SSB candidate occasions to received SSB indexes and the corresponding beams.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam selection discovery window monitoring as described herein, or the processor 940 and the memory 930 may be otherwise configured to perform or support such operations.

Figure 10:
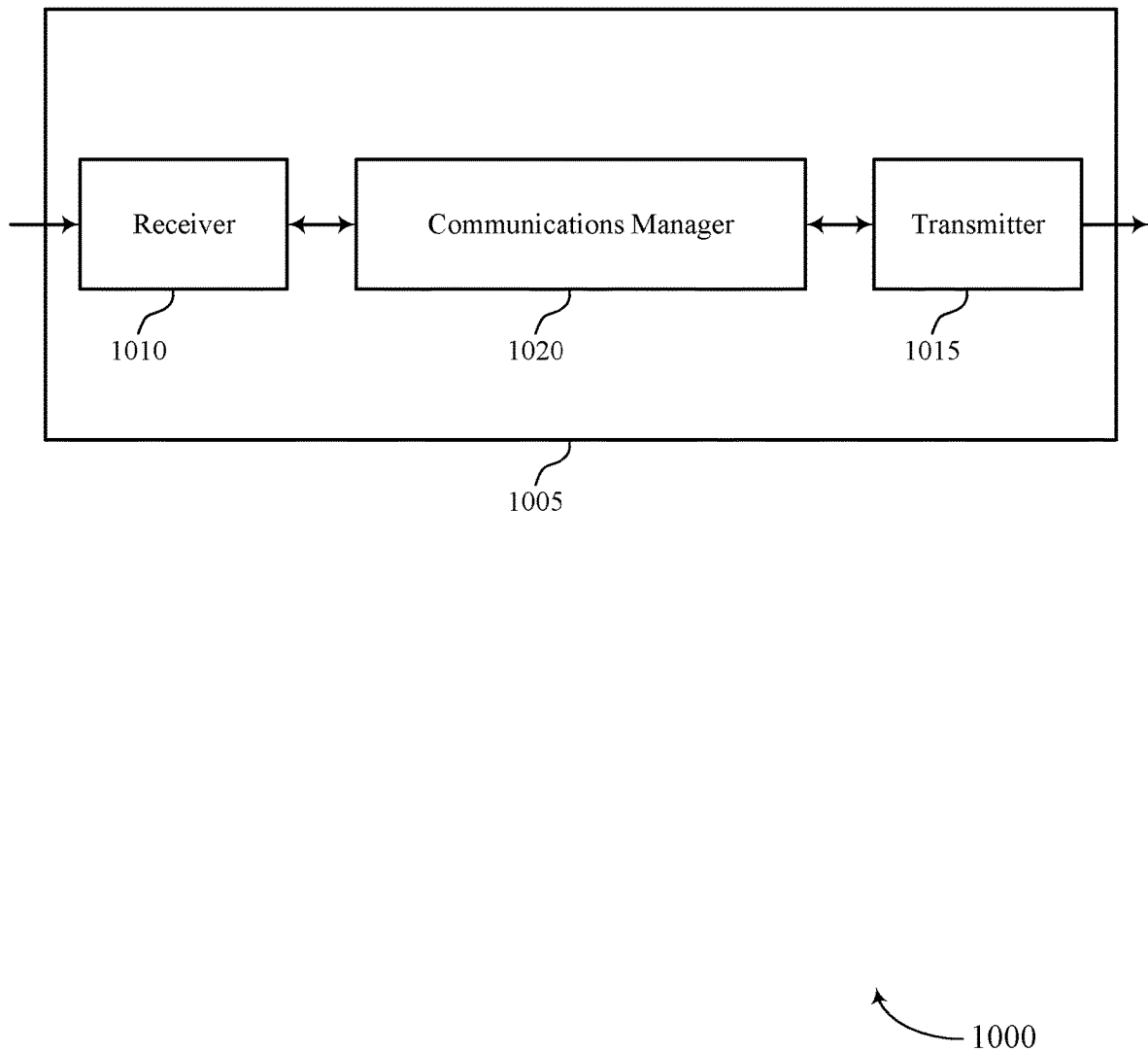
FIGS. 10 and 11 show block diagrams of devices that support beam selection discovery window monitoring in accordance with aspects of the present disclosure.

FIG. 10 shows a block diagram 1000 of a device 1005 that supports beam selection discovery window monitoring in accordance with aspects of the present disclosure. The device 1005 may be an example of aspects of a network entity (e.g., base station 105) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam selection discovery window monitoring). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam selection discovery window monitoring). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of beam selection discovery window monitoring as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for transmitting an indication of a numerical quantity of beams in a set of beams associated with SSB transmissions during a discovery window in a licensed radio frequency spectrum band. The communications manager 1020 may be configured as or otherwise support a means for transmitting one or more SSBs in accordance with the indication.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improving redundancy opportunities of SSB transmissions in order to increase communications efficiency and decrease latency. The communications manager 1020 may operate transmitter 1015 to transmit an indication of a repetition configuration of a set of beams, and the communications manager 1020 may transmit, using transmitter 1015, a set of SSB indexes according to the beam repetition configuration.

Figure 11:
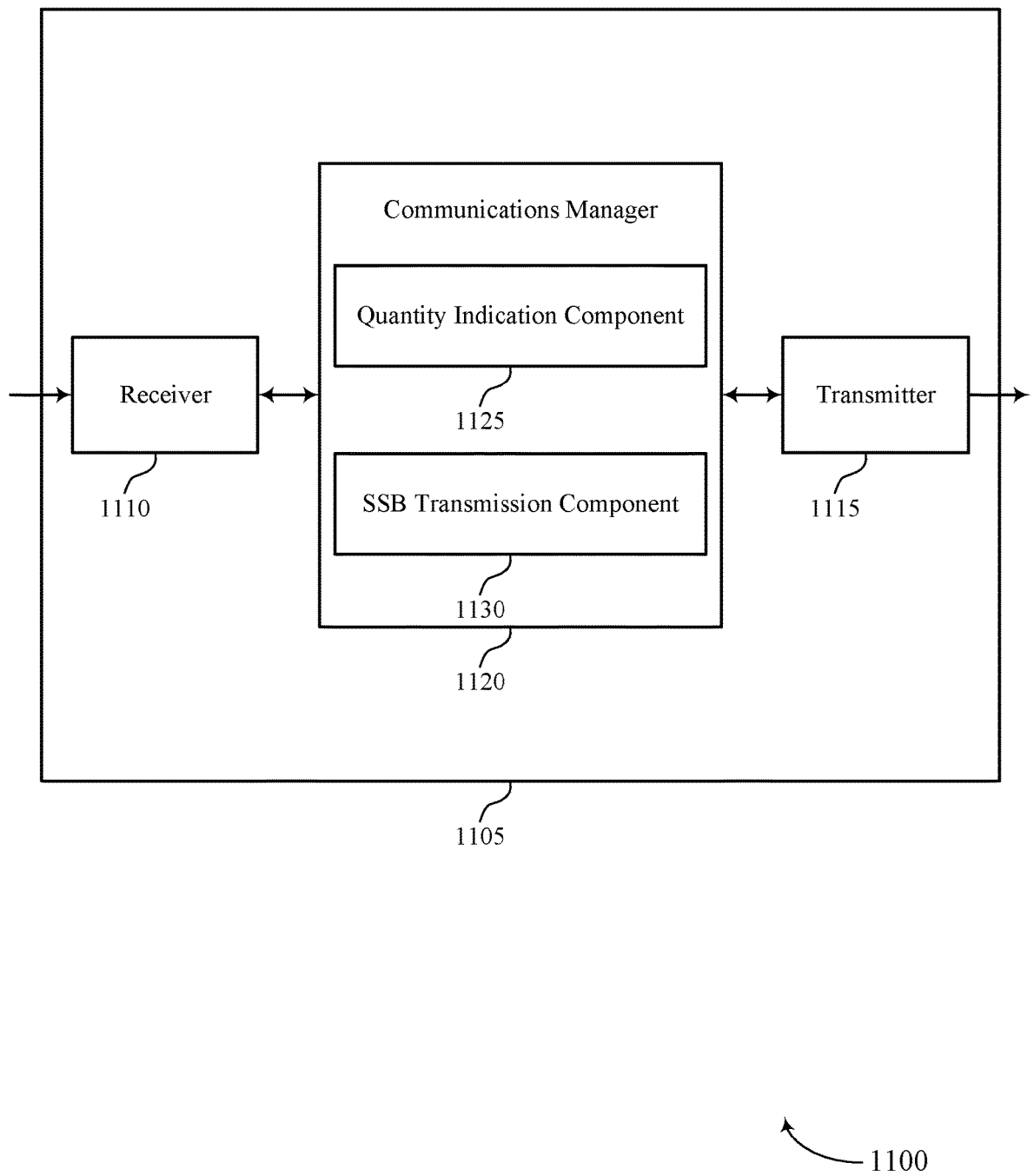

FIG. 11 shows a block diagram 1100 of a device 1105 that supports beam selection discovery window monitoring in accordance with aspects of the present disclosure. The device 1105 may be an example of aspects of a device 1005 or a network entity (e.g., base station 105) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to beam selection discovery window monitoring). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beam selection discovery window monitoring). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of beam selection discovery window monitoring as described herein. For example, the communications manager 1120 may include a quantity indication component 1125 an SSB transmission component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The quantity indication component 1125 may be configured as or otherwise support a means for transmitting an indication of a numerical quantity of beams in a set of beams associated with SSB transmissions during a discovery window in a licensed radio frequency spectrum band. The SSB transmission component 1130 may be configured as or otherwise support a means for transmitting one or more SSBs in accordance with the indication.

Figure 12:
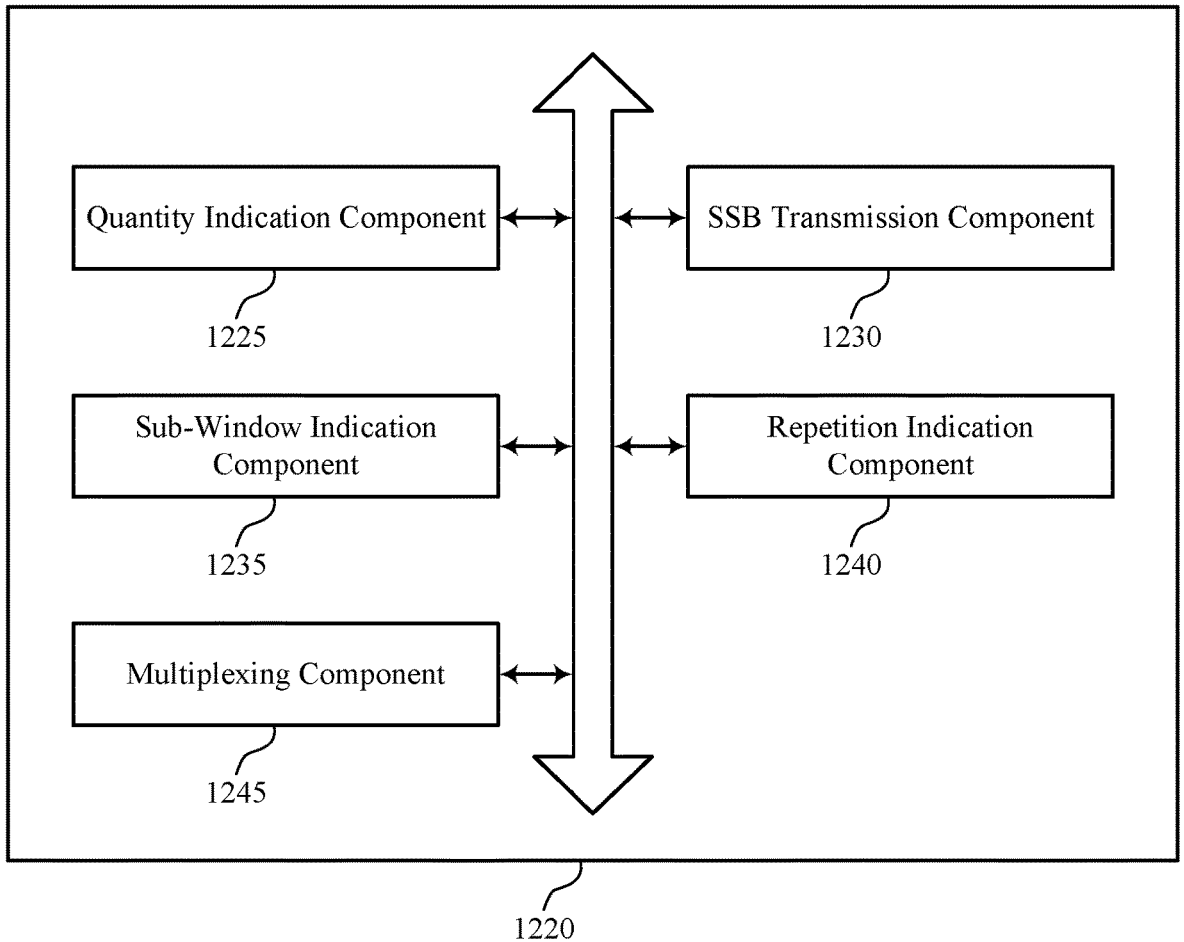
FIG. 12 shows a block diagram of a communications manager that supports beam selection discovery window monitoring in accordance with aspects of the present disclosure.

FIG. 12 shows a block diagram 1200 of a communications manager 1220 that supports beam selection discovery window monitoring in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of beam selection discovery window monitoring as described herein. For example, the communications manager 1220 may include a quantity indication component 1225, an SSB transmission component 1230, a sub-window indication component 1235, a repetition indication component 1240, a multiplexing component 1245, or any combination thereof. Each of these components may communicate, directly or indirectly, with one another (e.g., via one or more buses).

The communications manager 1220 may support wireless communication at a network entity in accordance with examples as disclosed herein. The quantity indication component 1225 may be configured as or otherwise support a means for transmitting an indication of a numerical quantity of beams in a set of beams associated with SSB transmissions during a discovery window in a licensed radio frequency spectrum band. The SSB transmission component 1230 may be configured as or otherwise support a means for transmitting one or more SSBs in accordance with the indication.

In some examples, to support transmitting the indication of the numerical quantity of beams, the quantity indication component 1225 may be configured as or otherwise support a means for transmitting an express value of the numerical quantity of beams.

In some examples, to support transmitting the indication of the numerical quantity of beams, the sub-window indication component 1235 may be configured as or otherwise support a means for transmitting a numerical value of sub-windows of the discovery window, each sub-window being associated with at least one SSB transmission over each beam of the set of beams, wherein the numerical quantity of beams is implicit in the numerical value of sub-windows.

In some examples, the repetition indication component 1240 may be configured as or otherwise support a means for transmitting a repetition parameter indicating a number of times each beam in the set of beams is repeated within each sub-window of the discovery window.

In some examples, each beam is repeated over consecutive SSB candidates of a plurality of SSB candidates within a given sub-window of the discovery window.

In some examples, the repetition indication component 1240 may be configured as or otherwise support a means for receiving a request for the repetition parameter. In some examples, the repetition indication component 1240 may be configured as or otherwise support a means for transmitting the repetition parameter responsive to the request for the repetition parameter.

In some examples, the repetition indication component 1240 may be configured as or otherwise support a means for receiving a UE capability to support the repetition parameter. In some examples, the repetition indication component 1240 may be configured as or otherwise support a means for transmitting the repetition parameter responsive to the UE capability to support the repetition parameter.

In some examples, to support transmitting the indication of the numerical quantity of beams, the quantity indication component 1225 may be configured as or otherwise support a means for transmitting one or more of: a MIB including the indication of the numerical quantity of beams, a SIB including the indication of the numerical quantity of beams, a RRC message including the indication of the numerical quantity of beams, or a PBCH transmission including the indication of the numerical quantity of beams.

In some examples, the quantity indication component 1225 may be configured as or otherwise support a means for transmitting the MIB including a SCS common field including the indication of the numerical quantity of beams.

In some examples, the multiplexing component 1245 may be configured as or otherwise support a means for performing a physical layer multiplexing of the PBCH transmission.

In some examples, the quantity indication component 1225 may be configured as or otherwise support a means for transmitting the indication of the numerical quantity of beams in the PBCH transmission.

In some examples, the quantity indication component 1225 may be configured as or otherwise support a means for receiving a request for the numerical quantity of beams. In some examples, the quantity indication component 1225 may be configured as or otherwise support a means for transmitting the indication of the numerical quantity of beams responsive to the request for the numerical quantity of beams.

In some examples, the quantity indication component 1225 may be configured as or otherwise support a means for receiving a UE capability to support the numerical quantity of beams. In some examples, the quantity indication component 1225 may be configured as or otherwise support a means for transmitting the indication of the numerical quantity of beams responsive to the UE capability to support the numerical quantity of beams.

Figure 13:
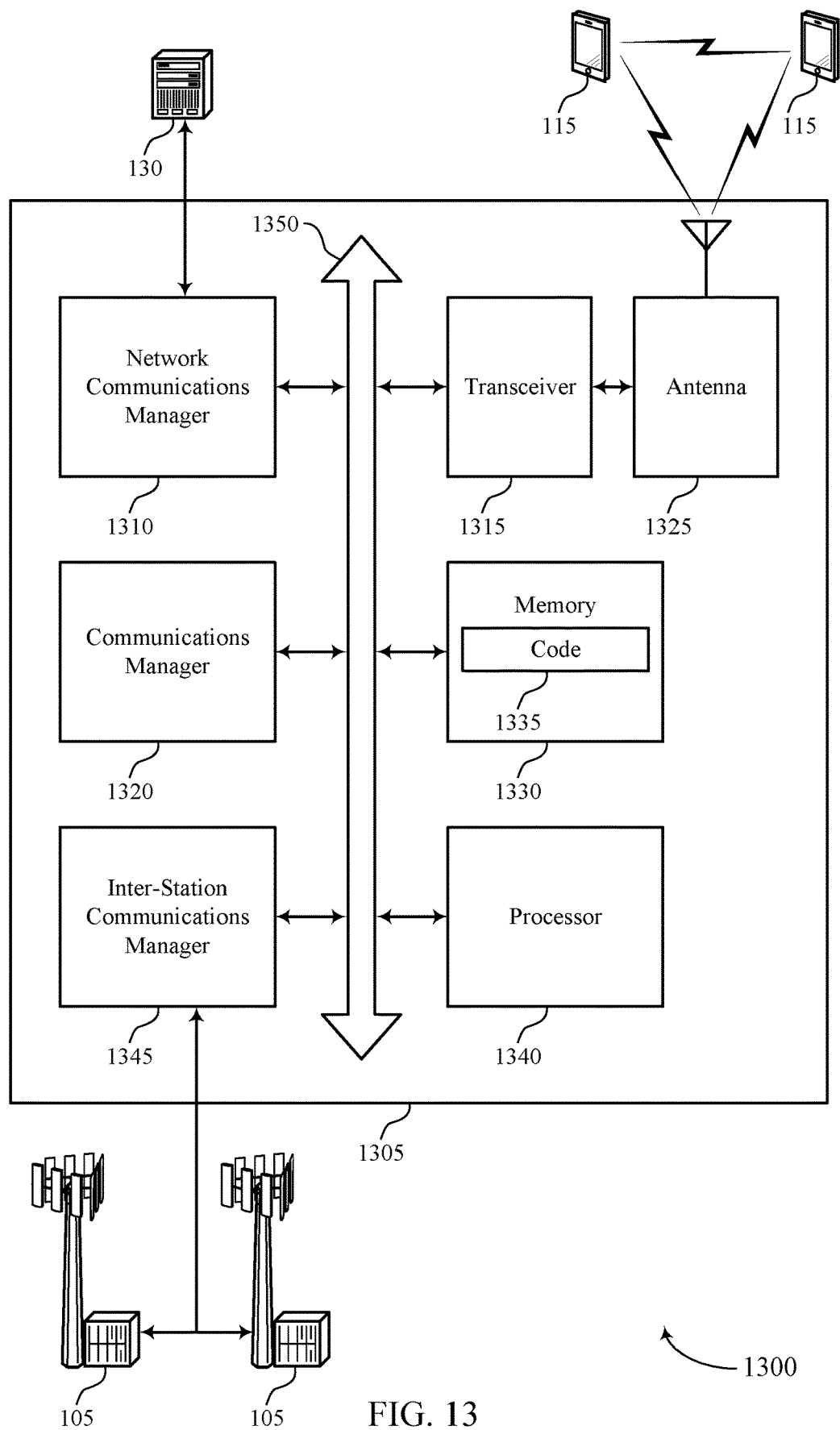
FIG. 13 shows a diagram of a system including a device that supports beam selection discovery window monitoring in accordance with aspects of the present disclosure.

FIG. 13 shows a diagram of a system 1300 including a device 1305 that supports beam selection discovery window monitoring in accordance with aspects of the present disclosure. The device 1305 may be an example of or include the components of a device 1005, a device 1105, or a network entity (e.g., base station 105) as described herein. The device 1305 may communicate wirelessly with one or more network entities (e.g., base stations 105), UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam selection discovery window monitoring). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other network entities (e.g., base stations 105), and may include a controller or scheduler for controlling communications with UEs 115 in cooperation with other network entities (e.g., base stations 105). For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entity (e.g., base stations 105).

The communications manager 1320 may support wireless communication at a base station in accordance with examples as disclosed herein. For example, the communications manager 1320 may be configured as or otherwise support a means for transmitting an indication of a numerical quantity of beams in a set of beams associated with SSB transmissions during a discovery window in a licensed radio frequency spectrum band. The communications manager 1320 may be configured as or otherwise support a means for transmitting one or more SSBs in accordance with the indication.

By including or configuring the communications manager 1320 in accordance with examples as described herein, the device 1305 may support techniques for improving redundancy opportunities of SSB transmissions in order to increase communications efficiency and decrease latency. The device 1305 may transmit an indication of a repetition configuration of a set of beams, and the communications manager 1320 may transmit, using a set of SSB indexes according to the beam repetition configuration.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of beam selection discovery window monitoring as described herein, or the processor 1340 and the memory 1330 may be otherwise configured to perform or support such operations.

Figure 14:
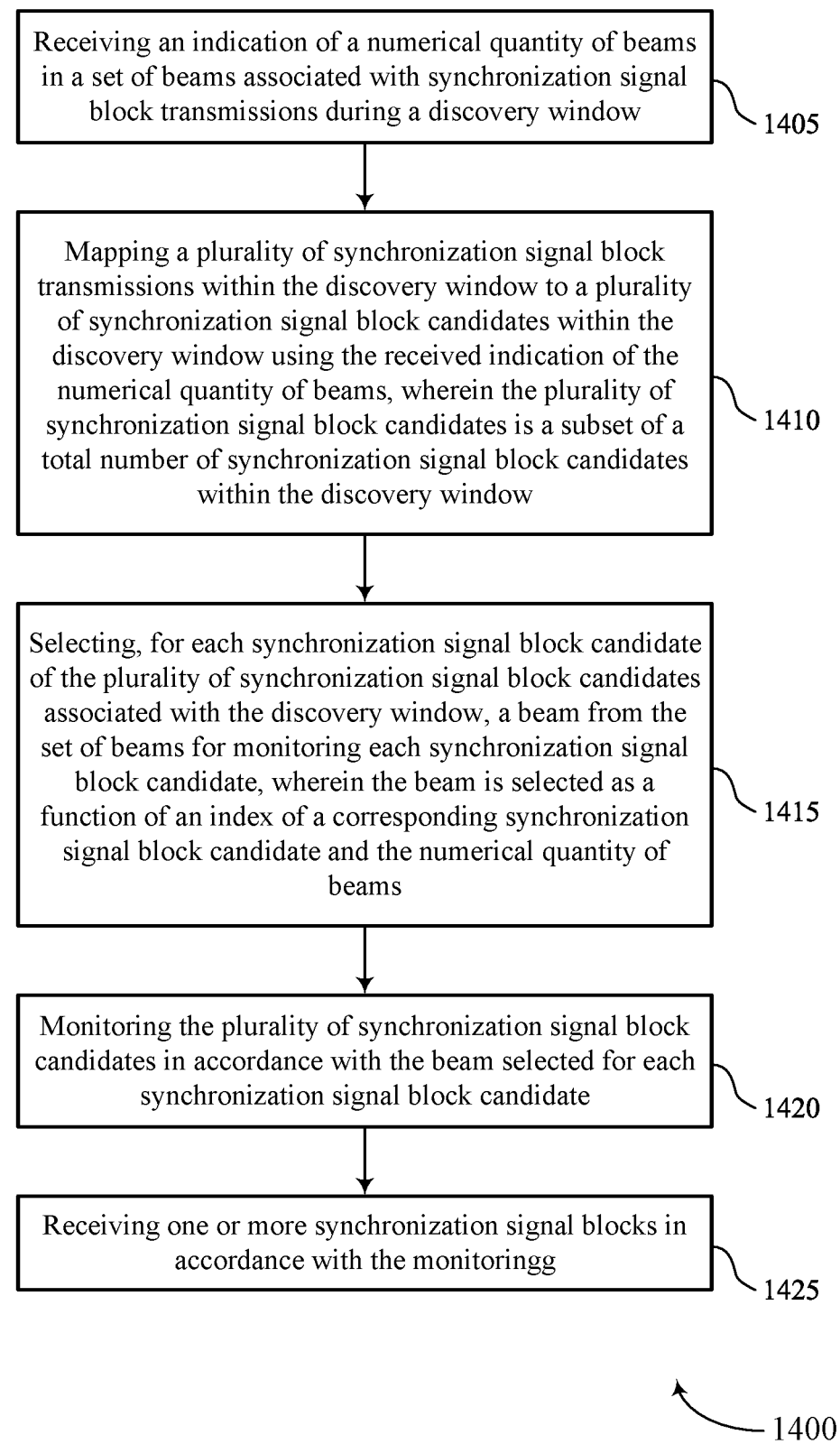
FIGS. 14 through 17 show flowcharts illustrating methods that support beam selection discovery window monitoring in accordance with aspects of the present disclosure.

FIG. 14 shows a flowchart illustrating a method 1400 that supports beam selection discovery window monitoring in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a numerical quantity of beams in a set of beams associated with synchronization signal block transmissions during a discovery window. The operations of 1405 may be performed in accordance with examples as disclosed herein. In some examples, aspects of the operations of 1405 may be performed by a beam quantity component 825 as described with reference to FIG. 8.

At 1410, the mapping a plurality of synchronization signal block transmissions within the discovery window to a plurality of synchronization signal block candidates within the discovery window using the received indication of the numerical quantity of beams, wherein the plurality of synchronization signal block candidates is a subset of a total number of synchronization signal block candidates within the discovery window. The operations of 1410 may be performed in accordance with examples as disclosed herein. In some examples, aspects of the operations of 1410 may be performed by an SSB mapping component 830 as described with reference to FIG. 8.

At 1415, the method may include selecting, for each synchronization signal block candidate of the plurality of synchronization signal block candidates associated with the discovery window, a beam from the set of beams for monitoring each synchronization signal block candidate, wherein the beam is selected as a function of an index of a corresponding synchronization signal block candidate and the numerical quantity of beams. The operations of 1415 may be performed in accordance with examples as disclosed herein. In some examples, aspects of the operations of 1415 may be performed by a beam selection component 835 as described with reference to FIG. 8.

At 1420, the method may include monitoring the plurality of synchronization signal block candidates in accordance with the beam selected for each synchronization signal block candidate. The operations of 1420 may be performed in accordance with examples as disclosed herein. In some examples, aspects of the operations of 1420 may be performed by an SSB monitoring component 840 as described with reference to FIG. 8.

At 1425, the method may include receiving one or more synchronization signal blocks in accordance with the monitoring. The operations of 1425 may be performed in accordance with examples as disclosed herein. In some examples, aspects of the operations of 1425 may be performed by an SSB reception component 845 as described with reference to FIG. 8.

Figure 15:
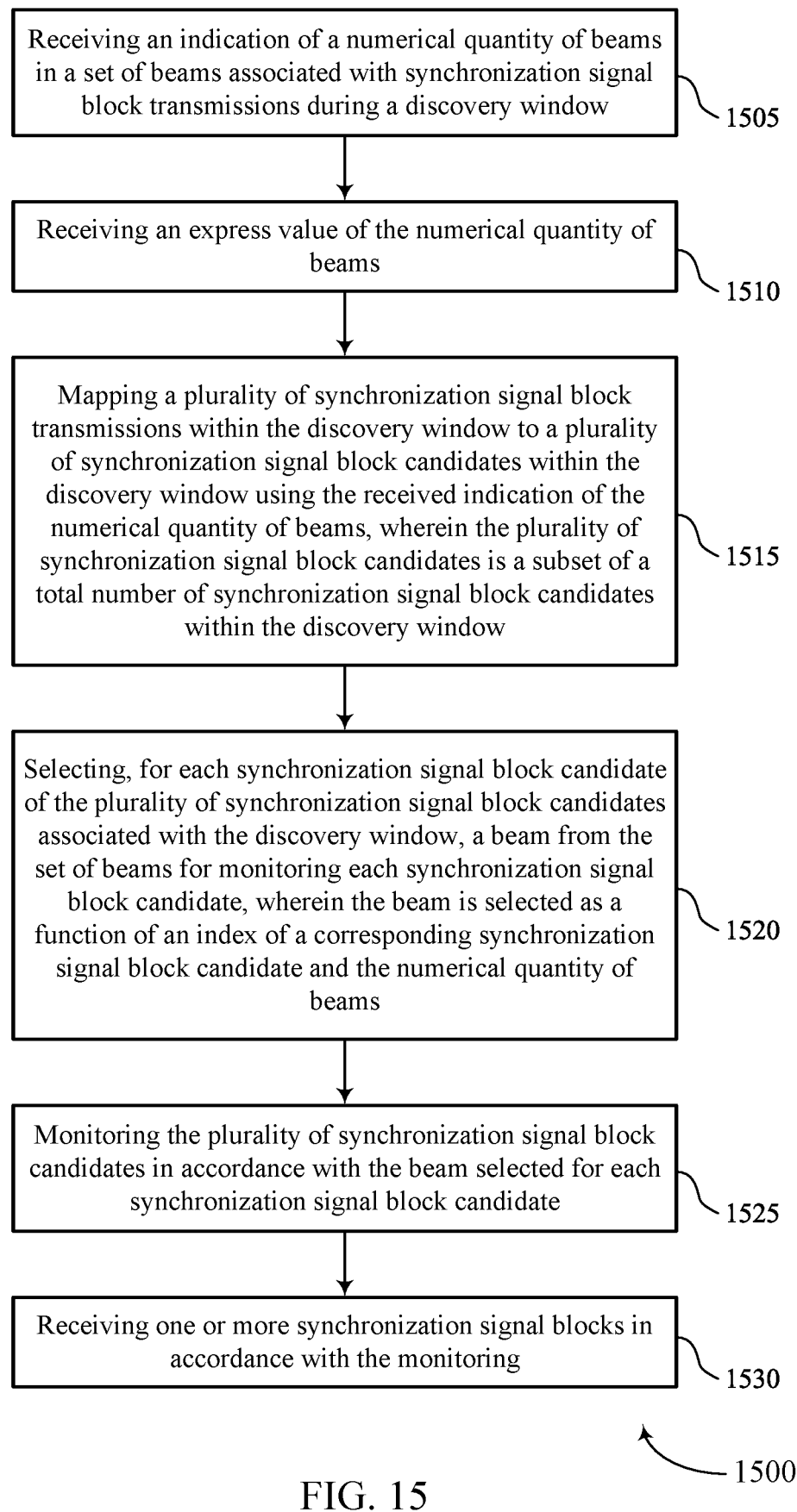

FIG. 15 shows a flowchart illustrating a method 1500 that supports beam selection discovery window monitoring in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a numerical quantity of beams in a set of beams associated with synchronization signal block transmissions during a discovery window. The operations of 1505 may be performed in accordance with examples as disclosed herein. In some examples, aspects of the operations of 1505 may be performed by a beam quantity component 825 as described with reference to FIG. 8.

At 1510, the method may include receiving an express value of the numerical quantity of beams. The operations of 1510 may be performed in accordance with examples as disclosed herein. In some examples, aspects of the operations of 1510 may be performed by a beam quantity component 825 as described with reference to FIG. 8.

At 1515, the method may include mapping a plurality of synchronization signal block transmissions within the discovery window to a plurality of synchronization signal block candidates within the discovery window using the received indication of the numerical quantity of beams, wherein the plurality of synchronization signal block candidates is a subset of a total number of synchronization signal block candidates within the discovery window. The operations of 1515 may be performed in accordance with examples as disclosed herein. In some examples, aspects of the operations of 1515 may be performed by an SSB mapping component 830 as described with reference to FIG. 8.

At 1520, the method may include selecting, for each synchronization signal block candidate of the plurality of synchronization signal block candidates associated with the discovery window, a beam from the set of beams for monitoring each synchronization signal block candidate, wherein the beam is selected as a function of an index of a corresponding synchronization signal block candidate and the numerical quantity of beams. The operations of 1520 may be performed in accordance with examples as disclosed herein. In some examples, aspects of the operations of 1520 may be performed by a beam selection component 835 as described with reference to FIG. 8.

At 1525, the method may include monitoring the plurality of synchronization signal block candidates in accordance with the beam selected for each synchronization signal block candidate. The operations of 1525 may be performed in accordance with examples as disclosed herein. In some examples, aspects of the operations of 1525 may be performed by an SSB monitoring component 840 as described with reference to FIG. 8.

At 1530, the method may include receiving one or more synchronization signal blocks in accordance with the monitoring. The operations of 1530 may be performed in accordance with examples as disclosed herein. In some examples, aspects of the operations of 1530 may be performed by an SSB reception component 845 as described with reference to FIG. 8.

Figure 16:
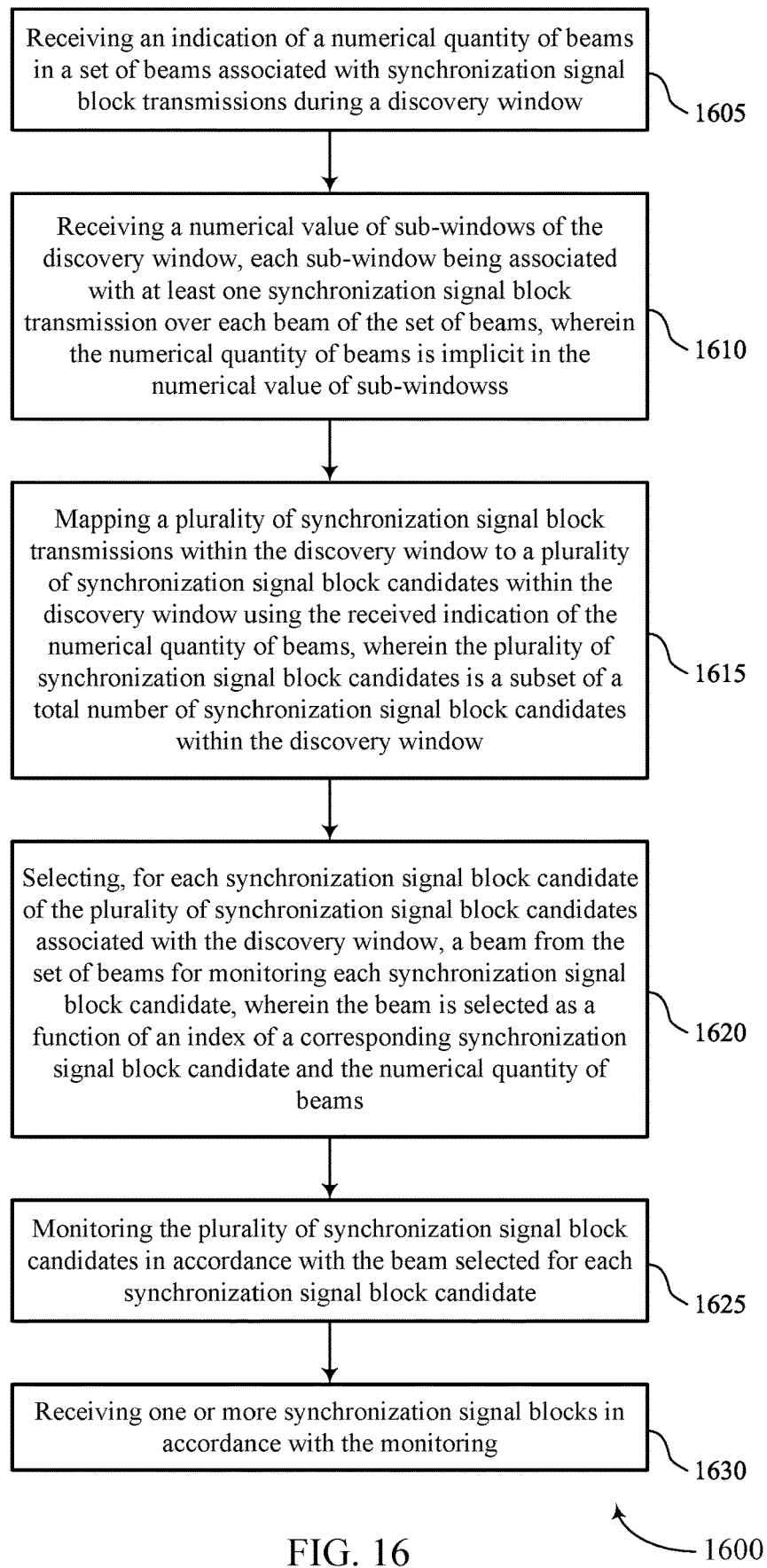

FIG. 16 shows a flowchart illustrating a method 1600 that supports beam selection discovery window monitoring in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving an indication of a numerical quantity of beams in a set of beams associated with synchronization signal block transmissions during a discovery window. The operations of 1605 may be performed in accordance with examples as disclosed herein. In some examples, aspects of the operations of 1605 may be performed by a beam quantity component 825 as described with reference to FIG. 8.

At 1610, the method may include receiving a numerical value of sub-windows of the discovery window, each sub-window being associated with at least one synchronization signal block transmission over each beam of the set of beams, wherein the numerical quantity of beams is implicit in the numerical value of sub-windows. The operations of 1610 may be performed in accordance with examples as disclosed herein. In some examples, aspects of the operations of 1610 may be performed by a sub-window component 850 as described with reference to FIG. 8.

At 1615, the method may include mapping a plurality of synchronization signal block transmissions within the discovery window to a plurality of synchronization signal block candidates within the discovery window using the received indication of the numerical quantity of beams, wherein the plurality of synchronization signal block candidates is a subset of a total number of synchronization signal block candidates within the discovery window. The operations of 1615 may be performed in accordance with examples as disclosed herein. In some examples, aspects of the operations of 1615 may be performed by an SSB mapping component 830 as described with reference to FIG. 8.

At 1620, the method may include selecting, for each synchronization signal block candidate of the plurality of synchronization signal block candidates associated with the discovery window, a beam from the set of beams for monitoring each synchronization signal block candidate, wherein the beam is selected as a function of an index of a corresponding synchronization signal block candidate and the numerical quantity of beams. The operations of 1620 may be performed in accordance with examples as disclosed herein. In some examples, aspects of the operations of 1620 may be performed by a beam selection component 835 as described with reference to FIG. 8.

At 1625, the method may include monitoring the plurality of synchronization signal block candidates in accordance with the beam selected for each synchronization signal block candidate. The operations of 1625 may be performed in accordance with examples as disclosed herein. In some examples, aspects of the operations of 1625 may be performed by an SSB monitoring component 840 as described with reference to FIG. 8.

At 1630, the method may include receiving one or more synchronization signal blocks in accordance with the monitoring. The operations of 1630 may be performed in accordance with examples as disclosed herein. In some examples, aspects of the operations of 1630 may be performed by an SSB reception component 845 as described with reference to FIG. 8.

Figure 17:
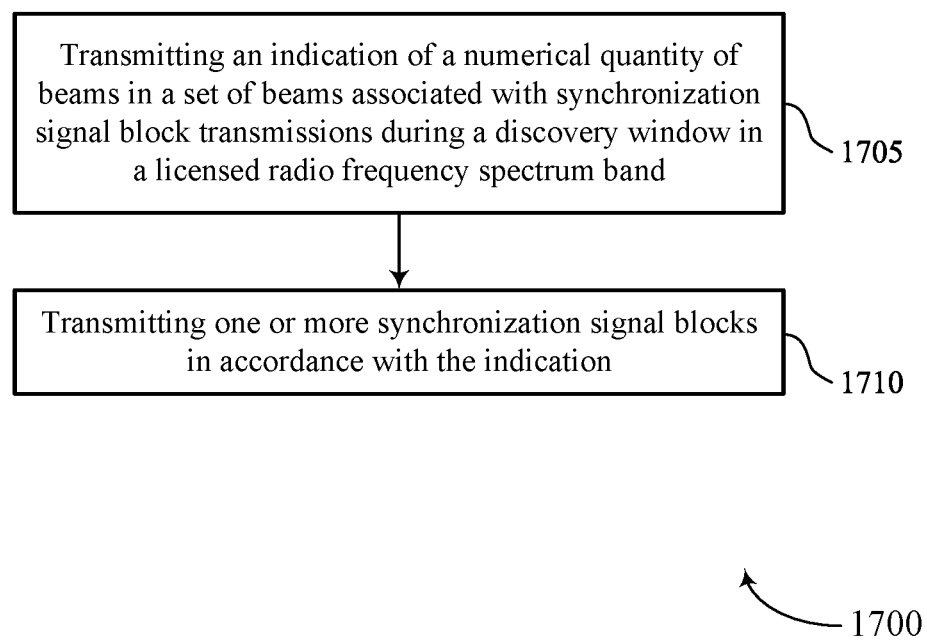

FIG. 17 shows a flowchart illustrating a method 1700 that supports beam selection discovery window monitoring in accordance with aspects of the present disclosure. The operations of the method 1700 may be implemented by a network entity (e.g., a base station or its components as described herein). For example, the operations of the method 1700 may be performed by a network entity (e.g., base station 105) as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting an indication of a numerical quantity of beams in a set of beams associated with synchronization signal block transmissions during a discovery window in a licensed radio frequency spectrum band. The operations of 1705 may be performed in accordance with examples as disclosed herein. In some examples, aspects of the operations of 1705 may be performed by a quantity indication component 1225 as described with reference to FIG. 12.

At 1710, the method may include transmitting one or more synchronization signal blocks in accordance with the indication. The operations of 1710 may be performed in accordance with examples as disclosed herein. In some examples, aspects of the operations of 1710 may be performed by an SSB transmission component 1230 as described with reference to FIG. 12.

The following provides an overview of aspects of the present disclosure:

Aspect 1: A method for wireless communication at a UE, comprising: receiving an indication of a numerical quantity of beams in a set of beams associated with SSB transmissions during a discovery window; mapping a plurality of SSB transmissions within the discovery window to a plurality of SSB candidates within the discovery window using the received indication of the numerical quantity of beams, wherein the plurality of SSB candidates is a subset of a total number of SSB candidates within the discovery window; selecting, for each SSB candidate of the plurality of SSB candidates associated with the discovery window, a beam from the set of beams for monitoring each SSB candidate, wherein the beam is selected as a function of an index of a corresponding SSB candidate and the numerical quantity of beams; monitoring the plurality of SSB candidates in accordance with the beam selected for each SSB candidate; and receiving one or more SSBs in accordance with the monitoring.

Aspect 2: The method of aspect 1, wherein receiving the indication of the numerical quantity of beams comprises: receiving an express value of the numerical quantity of beams.

Aspect 3: The method of any of aspects 1 through 2, wherein receiving the indication of the numerical quantity of beams comprises: receiving a numerical value of sub-windows of the discovery window, each sub-window being associated with at least one SSB transmission over each beam of the set of beams, wherein the numerical quantity of beams is implicit in the numerical value of sub-windows.

Aspect 4: The method of aspect 3, further comprising: receiving a repetition parameter indicating a number of times each beam in the set of beams is repeated within each sub-window of the discovery window.

Aspect 5: The method of aspect 4, wherein mapping the plurality of SSB transmissions to the plurality of SSB candidates is a further function of the repetition parameter.

Aspect 6: The method of any of aspects 4 through 5, wherein each beam is repeated over consecutive SSB candidates of the plurality of SSB candidates within a given sub-window of the discovery window.

Aspect 7: The method of any of aspects 4 through 6, further comprising: transmitting one or more of: a request for the repetition parameter or a UE capability to support the repetition parameter, wherein the repetition parameter is received responsive to the request for the repetition parameter or the UE capability to support the repetition parameter.

Aspect 8: The method of any of aspects 1 through 7, wherein monitoring the plurality of SSB candidates in accordance with the beam selected for each SSB candidate comprises: combining multiple SSB candidates within the discovery window, wherein the plurality of SSB candidates is associated with a single beam of the set of beams.

Aspect 9: The method of any of aspects 1 through 8, wherein monitoring the plurality of SSB candidates in accordance with the beam selected for each SSB candidate comprises: discarding one of multiple SSB candidates within the discovery window, wherein the plurality of SSB candidates are associated with a single beam of the set of beams.

Aspect 10: The method of any of aspects 1 through 9, wherein receiving the indication of the numerical quantity of beams comprises: receiving one or more of: a MIB comprising the indication of the numerical quantity of beams, a SIB comprising the indication of the numerical quantity of beams, a RRC message comprising the indication of the numerical quantity of beams, or a PBCH transmission comprising the indication of the numerical quantity of beams.

Aspect 11: The method of aspect 10, wherein indication of the numerical quantity of beams may be signaled by at least one bit in a SCS common field and at least one unused bit of MIB.

Aspect 12: The method of any of aspects 1 through 11, wherein the indication of the numerical quantity of beams in the set of beams corresponds to the SSB transmissions during the discovery window in a licensed radio frequency spectrum band.

Aspect 13: The method of any of aspects 1 through 12, further comprising: transmitting one or more of: a request for the numerical quantity of beams or a UE capability to support the numerical quantity of beams, wherein the indication of the numerical quantity of beams is received responsive to the request for the numerical quantity of beams or the UE capability to support the numerical quantity of beams.

Aspect 14: A method for wireless communication at a network entity, comprising: transmitting an indication of a numerical quantity of beams in a set of beams associated with SSB transmissions during a discovery window in a licensed radio frequency spectrum band; and transmitting one or more SSBs in accordance with the indication.

Aspect 15: The method of aspect 14, wherein transmitting the indication of the numerical quantity of beams comprises: transmitting an express value of the numerical quantity of beams.

Aspect 16: The method of any of aspects 14 through 15, wherein transmitting the indication of the numerical quantity of beams comprises: transmitting a numerical value of sub-windows of the discovery window, each sub-window being associated with at least one SSB transmission over each beam of the set of beams, wherein the numerical quantity of beams is implicit in the numerical value of sub-windows.

Aspect 17: The method of aspect 16, further comprising: transmitting a repetition parameter indicating a number of times each beam in the set of beams is repeated within each sub-window of the discovery window.

Aspect 18: The method of aspect 17, wherein each beam is repeated over consecutive SSB candidates of a plurality of SSB candidates within a given sub-window of the discovery window.

Aspect 19: The method of any of aspects 17 through 18, further comprising: receiving a request for the repetition parameter; and transmitting the repetition parameter responsive to the request for the repetition parameter.

Aspect 20: The method of any of aspects 17 through 19, further comprising: receiving a UE capability to support the repetition parameter; and transmitting the repetition parameter responsive to the UE capability to support the repetition parameter.

Aspect 21: The method of any of aspects 14 through 20, wherein transmitting the indication of the numerical quantity of beams comprises: transmitting one or more of: a MIB comprising the indication of the numerical quantity of beams, a SIB comprising the indication of the numerical quantity of beams, a RRC message comprising the indication of the numerical quantity of beams, or a PBCH transmission comprising the indication of the numerical quantity of beams.

Aspect 22: The method of aspect 21, further comprising: transmitting the MIB comprising a SCS common field comprising the indication of the numerical quantity of beams.

Aspect 23: The method of any of aspects 21 through 22, further comprising: performing a physical layer multiplexing of the PBCH transmission; transmitting the indication of the numerical quantity of beams in the PBCH transmission.

Aspect 24: The method of any of aspects 14 through 23, further comprising: receiving a request for the numerical quantity of beams; and transmitting the indication of the numerical quantity of beams responsive to the request for the numerical quantity of beams.

Aspect 25: The method of any of aspects 14 through 24, further comprising: receiving a UE capability to support the numerical quantity of beams; and transmitting the indication of the numerical quantity of beams responsive to the UE capability to support the numerical quantity of beams.

Aspect 26: An apparatus for wireless communication at a UE, comprising a processor; memory coupled with the processor; and wherein the memory stores instructions executable by the processor to cause the apparatus to perform a method of any of aspects 1 through 13.

Aspect 27: An apparatus for wireless communication at a UE, comprising at least one means for performing a method of any of aspects 1 through 13.

Aspect 28: A non-transitory computer-readable medium storing code for wireless communication at a UE, the code comprising instructions executable by a processor to perform a method of any of aspects 1 through 13.

Aspect 29: An apparatus for wireless communication at a network entity, comprising a processor; memory coupled with the processor; and wherein the memory stores instructions executable by the processor to cause the apparatus to perform a method of any of aspects 14 through 25.

Aspect 30: An apparatus for wireless communication at a network entity, comprising at least one means for performing a method of any of aspects 14 through 25.

Aspect 31: A non-transitory computer-readable medium storing code for wireless communication at a network entity, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based at least in part on" shall not be construed as a reference to a closed set of conditions. For example, an example step that is described as "based at least in part on condition A" may be based at least in part on both a condition A and a condition B without departing from the scope of the present disclosure. In other words, as used herein, the phrase "based at least in part on" shall be construed in the same manner as the phrase "based on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    determining a numerical quantity of beams in a set of beams associated with synchronization signal block transmissions during a discovery window, wherein the numerical quantity is less than a maximum number of beams supported by a network entity;
    mapping a plurality of synchronization signal block transmissions within the discovery window to a plurality of synchronization signal block candidates within the discovery window using the numerical quantity of beams, wherein the plurality of synchronization signal block candidates is a subset of a total number of synchronization signal block candidates within the discovery window;
    selecting, for each synchronization signal block candidate of the plurality of synchronization signal block candidates associated with the discovery window, a respective beam from the set of beams for monitoring each synchronization signal block candidate, wherein the respective beam is selected as a function of an index of a corresponding synchronization signal block candidate and the numerical quantity of beams, wherein at least a first beam from the set of beams is associated with two or more synchronization signal block candidates;
    monitoring the plurality of synchronization signal block candidates in accordance with the respective beam selected for each synchronization signal block candidate; and
    receiving one or more synchronization signal blocks in accordance with the monitoring, wherein a single synchronization signal block is received via one of the two or more synchronization signal block candidates associated with the first beam.

2. The method of claim 1, wherein determining the numerical quantity of beams comprises:
    receiving an express value of the numerical quantity of beams.

3. The method of claim 1, wherein determining the numerical quantity of beams comprises:
    receiving a numerical value of sub-windows of the discovery window, each sub-window being associated with at least one synchronization signal block transmission over each beam of the set of beams, wherein the numerical quantity of beams is implicit in the numerical value of sub-windows.

4. The method of claim 3, further comprising:
    receiving a repetition parameter indicating a number of times each beam in the set of beams is repeated within each sub-window of the discovery window.

5. The method of claim 4, wherein mapping the plurality of synchronization signal block transmissions to the plurality of synchronization signal block candidates is a further function of the repetition parameter.

6. The method of claim 4, wherein each beam is repeated over consecutive synchronization signal block candidates of the plurality of synchronization signal block candidates within a given sub-window of the discovery window.

7. The method of claim 4, further comprising:
    transmitting one or more of: a request for the repetition parameter or a UE capability to support the repetition parameter, wherein the repetition parameter is received responsive to the request for the repetition parameter or the UE capability to support the repetition parameter.

8. The method of claim 1, wherein monitoring the plurality of synchronization signal block candidates in accordance with the beam selected for each synchronization signal block candidate comprises:
    combining multiple synchronization signal block candidates within the discovery window, wherein the plurality of synchronization signal block candidates are associated with a single beam of the set of beams.

9. The method of claim 1, wherein monitoring the plurality of synchronization signal block candidates in accordance with the beam selected for each synchronization signal block candidate comprises:
    discarding one of multiple synchronization signal block candidates within the discovery window, wherein the plurality of synchronization signal block candidates are associated with a single beam of the set of beams.

10. The method of claim 1, wherein determining the numerical quantity of beams comprises:
    receiving a master information block comprising an indication of the numerical quantity of beams.

11. The method of claim 10, wherein the numerical quantity of beams is signaled by at least one bit in a subcarrier spacing common field and at least one unused bit of the master information block.

12. The method of claim 1, wherein the numerical quantity of beams in the set of beams corresponds to the synchronization signal block transmissions during the discovery window in a licensed radio frequency spectrum band.

13. The method of claim 1, further comprising:
    transmitting one or more of: a request for the numerical quantity of beams or a UE capability to support the numerical quantity of beams, wherein an indication of the numerical quantity of beams is received responsive to the request for the numerical quantity of beams or the UE capability to support the numerical quantity of beams.

14. A method for wireless communication at a network entity, comprising:
    transmitting an indication of a numerical quantity of beams in a set of beams associated with synchronization signal block transmissions during a discovery window in a licensed radio frequency spectrum band, wherein the numerical quantity is less than a maximum number of beams supported by the network entity, wherein at least a first beam from the set of beams is associated with two or more synchronization signal block candidates; and
    transmitting one or more synchronization signal blocks in accordance with the indication, wherein a single synchronization signal block is transmitted via one of the two or more synchronization signal block candidates associated with the first beam.

15. The method of claim 14, wherein transmitting the indication of the numerical quantity of beams comprises:

transmitting an express value of the numerical quantity of beams.

16. The method of claim 14, wherein transmitting the indication of the numerical quantity of beams comprises:
transmitting a numerical value of sub-windows of the discovery window, each sub-window being associated with at least one synchronization signal block transmission over each beam of the set of beams, wherein the numerical quantity of beams is implicit in the numerical value of sub-windows.

17. The method of claim 16, further comprising:
transmitting a repetition parameter indicating a number of times each beam in the set of beams is repeated within each sub-window of the discovery window.

18. The method of claim 17, wherein each beam is repeated over consecutive synchronization signal block candidates of a plurality of synchronization signal block candidates within a given sub-window of the discovery window.

19. The method of claim 17, further comprising:
receiving a request for the repetition parameter; and
transmitting the repetition parameter responsive to the request for the repetition parameter.

20. The method of claim 17, further comprising:
receiving a user equipment (UE) capability to support the repetition parameter; and
transmitting the repetition parameter responsive to the UE capability to support the repetition parameter.

21. The method of claim 14, wherein transmitting the indication of the numerical quantity of beams comprises:
transmitting one or more of: a master information block comprising the indication of the numerical quantity of beams, a system information block comprising the indication of the numerical quantity of beams, a radio resource control message comprising the indication of the numerical quantity of beams, or a physical broadcast channel transmission comprising the indication of the numerical quantity of beams.

22. The method of claim 21, further comprising:
transmitting the master information block comprising a subcarrier spacing common field comprising the indication of the numerical quantity of beams.

23. The method of claim 21, further comprising:
performing a physical layer multiplexing of the physical broadcast channel transmission; and
transmitting the indication of the numerical quantity of beams in the physical broadcast channel transmission.

24. The method of claim 14, further comprising:
receiving a request for the numerical quantity of beams; and
transmitting the indication of the numerical quantity of beams responsive to the request for the numerical quantity of beams.

25. The method of claim 14, further comprising:
receiving a UE capability to support the numerical quantity of beams; and
transmitting the indication of the numerical quantity of beams responsive to the UE capability to support the numerical quantity of beams.

26. An apparatus for wireless communication at a user equipment (UE), comprising:
a processor; and
a memory coupled with the processor, wherein the memory includes instructions executable by the processor to cause the apparatus to:
determine a numerical quantity of beams in a set of beams associated with synchronization signal block transmissions during a discovery window, wherein the numerical quantity is less than a maximum number of beams supported by a network entity;
map a plurality of synchronization signal block transmissions within the discovery window to a plurality of synchronization signal block candidates within the discovery window using the numerical quantity of beams, wherein the plurality of synchronization signal block candidates is a subset of a total number of synchronization signal block candidates within the discovery window;
select, for each synchronization signal block candidate of the plurality of synchronization signal block candidates associated with the discovery window, a respective beam from the set of beams for monitoring each synchronization signal block candidate, wherein the respective beam is selected as a function of an index of a corresponding synchronization signal block candidate and the numerical quantity of beams, wherein at least a first beam from the set of beams is associated with two or more synchronization signal block candidates;
monitor the plurality of synchronization signal block candidates in accordance with the respective beam selected for each synchronization signal block candidate; and
receive one or more synchronization signal blocks in accordance with a monitoring of the plurality of synchronization signal block candidates, wherein a single synchronization signal block is received via one of the two or more synchronization signal block candidates associated with the first beam.

27. The apparatus of claim 26, wherein the instructions to determine the numerical quantity of beams are executable by the processor to cause the apparatus to:
receive an express value of the numerical quantity of beams.

28. The apparatus of claim 26, wherein the instructions to determine the numerical quantity of beams are executable by the processor to cause the apparatus to:
receive a numerical value of sub-windows of the discovery window, each sub-window being associated with at least one synchronization signal block transmission over each beam of the set of beams, wherein the numerical quantity of beams is implicit in the numerical value of sub-windows.

29. An apparatus for wireless communication at a network entity, comprising:
a processor; and
a memory coupled with the processor, wherein the memory includes instructions executable by the processor to cause the apparatus to:
transmit an indication of a numerical quantity of beams in a set of beams associated with synchronization signal block transmissions during a discovery window in a licensed radio frequency spectrum band, wherein the numerical quantity is less than a maximum number of beams supported by the network entity, wherein at least a first beam from the set of beams is associated with two or more synchronization signal block candidates; and
transmit one or more synchronization signal blocks in accordance with the indication, wherein a single synchronization signal block is transmitted via one of the two or more synchronization signal block candidates associated with the first beam.

30. The apparatus of claim 29, wherein the instructions to transmit the indication of the numerical quantity of beams are executable by the processor to cause the apparatus to:
   transmit an express value of the numerical quantity of beams.

* * * * *